United States Patent
Hunter et al.

(10) Patent No.: US 10,581,981 B2
(45) Date of Patent: Mar. 3, 2020

(54) SEAMLESSLY SWITCHING BETWEEN MODES IN A DUAL-DEVICE TUTORIAL SYSTEM

(71) Applicant: Apple Inc., Cupertino, CA (US)

(72) Inventors: Alexander M. Hunter, Marietta, GA (US); Eric D. Schlakman, San Francisco, CA (US); Ryan K. Mears, Los Altos, CA (US); Ieyuki Kawashima, San Jose, CA (US); Ryan M. Romero, Irvine, CA (US); Ronald L. Jett, Mountain View, CA (US); Andrew M. Fallon, San Jose, CA (US); Yen Lai, San Jose, CA (US); David A. Rudolph, San Jose, CA (US); Andrew T. Dean, San Francisco, CA (US); Ameya A. Mhatre, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 15/080,229

(22) Filed: Mar. 24, 2016

(65) Prior Publication Data
US 2016/0299769 A1    Oct. 13, 2016

Related U.S. Application Data

(60) Provisional application No. 62/145,368.

(51) Int. Cl.
*G06F 3/048* (2013.01)
*H04L 29/08* (2006.01)
(Continued)

(52) U.S. Cl.
CPC .......... *H04L 67/148* (2013.01); *G06F 3/0484* (2013.01); *G06Q 10/06* (2013.01);
(Continued)

(58) Field of Classification Search
CPC ............................ H04L 67/148; G06F 3/0484
(Continued)

(56) References Cited

U.S. PATENT DOCUMENTS

| 6,021,315 A | 2/2000 | Telewski |
| 7,177,952 B1 | 2/2007 | Wurch et al. |

(Continued)

FOREIGN PATENT DOCUMENTS

| EP | 1 773 038 B1 | 11/2007 |
| TW | 200519704 A | 6/2005 |

(Continued)

OTHER PUBLICATIONS

International Patent Application No. PCT/US2016/026239, International Preliminary Report on Patentability, dated Oct. 19, 2017, 7 pages.

(Continued)

*Primary Examiner* — Andrey Belousov
(74) *Attorney, Agent, or Firm* — Kilpatrick Townsend & Stockton LLP

(57) ABSTRACT

A dual-device tutorial system can facilitate user learning about a "primary" device by providing explanatory information on a "supporting" device while the user interacts with the primary device. The primary and supporting devices can be devices of different types. From a user perspective, the primary device can operate exactly as it would in normal (non-tutorial) use and can send event messages and/or other signals to the supporting device. Based on the event messages and/or other signals, the supporting device can provide explanatory information responsive to user interactions with the primary device.

22 Claims, 20 Drawing Sheets

(51) Int. Cl.

| | |
|---|---|
| *G06Q 10/06* | (2012.01) |
| *H04L 29/06* | (2006.01) |
| *H04W 12/08* | (2009.01) |
| *H04M 1/725* | (2006.01) |
| *G09B 5/02* | (2006.01) |
| *G09B 19/00* | (2006.01) |
| *G06F 3/0484* | (2013.01) |
| *G06F 9/451* | (2018.01) |

(52) U.S. Cl.
CPC ............... *G09B 5/02* (2013.01); *G09B 19/00* (2013.01); *H04L 63/0428* (2013.01); *H04L 63/10* (2013.01); *H04L 67/141* (2013.01); *H04M 1/72527* (2013.01); *H04M 1/72552* (2013.01); *H04M 1/72583* (2013.01); *H04W 12/08* (2013.01); *G06F 9/453* (2018.02)

(58) Field of Classification Search
USPC .................................................. 715/708, 711
See application file for complete search history.

(56) References Cited

U.S. PATENT DOCUMENTS

| | | | |
|---|---|---|---|
| 7,913,297 B2 | 3/2011 | Wyld | |
| 8,255,836 B1* | 8/2012 | Gildfind | G06F 3/04812 |
| | | | 345/173 |
| 8,503,340 B1 | 8/2013 | Xu | |
| 8,751,973 B2 | 6/2014 | Han et al. | |
| 8,845,337 B1 | 9/2014 | Hu et al. | |
| 8,908,580 B2 | 12/2014 | Shen | |
| 8,966,138 B2 | 2/2015 | Rathi et al. | |
| 10,075,536 B2 | 9/2018 | Sanchez-Sandoval et al. | |
| 2004/0225613 A1 | 11/2004 | Narayanaswami et al. | |
| 2005/0239496 A1 | 10/2005 | Sylvain | |
| 2006/0217104 A1 | 9/2006 | Cho | |
| 2006/0223522 A1 | 10/2006 | Guo et al. | |
| 2007/0122789 A1 | 5/2007 | Yoo | |
| 2008/0070501 A1 | 3/2008 | Wyld | |
| 2008/0259829 A1 | 10/2008 | Rosenblatt | |
| 2009/0037522 A1 | 2/2009 | Ozawa et al. | |
| 2011/0004325 A1 | 1/2011 | Ayal | |
| 2011/0225292 A1 | 9/2011 | Lee | |
| 2012/0106441 A1 | 5/2012 | Juneja et al. | |
| 2013/0326092 A1 | 12/2013 | Kang et al. | |
| 2014/0149255 A1 | 5/2014 | Bouma et al. | |
| 2014/0310754 A1 | 10/2014 | Collart et al. | |
| 2014/0315492 A1 | 10/2014 | Woods | |
| 2014/0347181 A1 | 11/2014 | Luna et al. | |
| 2014/0358951 A1 | 12/2014 | Luna et al. | |
| 2015/0058942 A1 | 2/2015 | Dermu | |
| 2015/0061968 A1* | 3/2015 | Park | G06F 3/1423 |
| | | | 345/2.1 |
| 2015/0094544 A1 | 4/2015 | Spolin et al. | |
| 2015/0245722 A1 | 9/2015 | Sanford et al. | |
| 2016/0014266 A1 | 1/2016 | Bhatt | |
| 2016/0037345 A1 | 2/2016 | Margadoudakis | |
| 2016/0085329 A1* | 3/2016 | Yim | G06F 21/35 |
| | | | 345/173 |
| 2016/0349978 A1 | 12/2016 | Gonsalves et al. | |
| 2016/0359981 A1 | 12/2016 | Ulatoski et al. | |
| 2017/0148335 A1 | 5/2017 | Michalscheck et al. | |

FOREIGN PATENT DOCUMENTS

| | | |
|---|---|---|
| TW | 201234262 A | 8/2012 |
| WO | 2014/143776 A2 | 9/2014 |
| WO | 2014143776 A2 | 9/2014 |

OTHER PUBLICATIONS

Notice of Allowance dated Mar. 22, 2017 in U.S. Appl. No. 15/080,215, 10 pages.
Taiwan Office Action for ROC (Taiwan) Pat Appln. No. 105111128, dated Feb. 10, 2017, 8 pages.
Non-Final Office Action dated Jan. 9, 2017 for U.S. Appl. No. 15/080,215 in 13 pages.
(Unpublished) U.S. Appl. No. 15/080,191, filed Mar. 24, 2016.
(Unpublished) U.S. Appl. No. 15/080,203, filed Mar. 24, 2016.
(Unpublished) U.S. Appl. No. 15/080,215, filed Mar. 24, 2016.
International Search Report and Written Opinion for International Application No. PCT/US2016/026239 dated Jun. 9, 2016. 11 pages.
Chen, "Anthony" Xiang, et al. "Duet: Exploring Joint Interactions on a Smart Phone and a Smart Watch." Human Factors in Computing Systems, ACM, 2 Penn Plaza, Suite 701, New York, NY 10121-0701. Apr. 26, 2014. pp. 159-168.
Taiwan Patent Application No. 105111128 , "Notice of Decision to Grant", dated Oct. 27, 2017, 3 pages.
U.S. Appl. No. 15/080,203 , "First Action Interview Pilot Program Pre-Interview Communication", dated Feb. 20, 2018, 5 pages.
U.S. Appl. No. 15/080,191, First Action Interview Pilot Program Pre-Interview Communication, dated Jan. 11, 2018, 4 pages.
U.S. Appl. No. 15/080,203, "First Action Interview Office Action Summary", dated May 21, 2018, 6 pages.
U.S. Appl. No. 15/080,191, "Notice of Allowance", dated May 18, 2018, 14 pages.
U.S. Appl. No. 15/080,203 , "Notice of Allowance", dated Nov. 29, 2018, 8 pages.

* cited by examiner

SEAMLESSLY SWITCHING BETWEEN MODES IN A DUAL-DEVICE TUTORIAL SYSTEM

CROSS-REFERENCE TO RELATED APPLICATION

This application claims the benefit of U.S. Provisional Application No. 62/145,368, filed Apr. 9, 2015, entitled "Dual-Device Tutorial System," the disclosure of which is incorporated by reference herein in its entirety.

BACKGROUND

The present disclosure relates generally to user interaction with electronic devices and more specifically to a dual-device tutorial system.

Personal electronic devices such as mobile phones and wearable devices can support a large number of different functionalities, e.g., using a variety of application programs (apps). Apps can include apps that are "native" to the device (e.g., apps supplied with the device when initially delivered to the user) and/or "third-party" apps (e.g., apps installed on the device by the user after initial delivery). By executing various apps, a device can implement various functionalities, such as providing information to the user (e.g., presenting weather data, stock quotes), facilitating communications between the user and others (e.g., placing and receiving phone calls, sending and receiving SMS or e-mail messages), entertaining the user (e.g., playing a game, presenting media content), and so on. The sheer number of different apps and functionalities available in a single device can make it difficult for a user to understand the device's capabilities and how to use them.

SUMMARY

Certain embodiments of the present invention relate to tutorial systems that can facilitate user learning about a "primary" device by providing explanatory information on a "supporting" device while the user interacts with the primary device. The primary device can be a device of a particular type (e.g., a wearable device such as a watch). The supporting device can be a device of a different type (e.g., a tablet computer or the like). The use of a separate supporting device can allow explanatory information to be presented without obscuring any information presented at the primary device. In some embodiments, the supporting device can have a larger display than the primary device, allowing more explanatory information to be conveyed than would fit on a display of the primary device. In addition, in some embodiments, the primary device can operate exactly as it would in "normal" (non-tutorial) use, with all explanatory information being provided via the supporting device. This can allow the user to understand and experience realistic interactions with the primary device rather than with a "demo" version that may lack features or provide information that the primary device in a normal (non-tutorial) setting would not provide; at the same time, the user can receive information via the supporting device about a specific interaction the user is performing with the primary device, which can help the user learn how to operate the primary device.

Explanatory information can include any type of information related to a user interaction with or current state of the primary device. For example, explanatory information can include an annotated rendering of the display of the primary device, a description of what is being presented at the primary device, descriptions of operations the user can perform from the current state of the primary device, and/or other information as desired. The particular explanatory information and manner of presentation can be varied as desired. For example, the presentation can incorporate any or all of static visual elements (e.g., text and/or images), animations, audio elements (e.g., playing a recorded audio clip), video elements, and so on.

For example, the primary device might be a wearable device such as a watch that has a touchscreen display and/or another input device (e.g., a button, dial, or the like). The supporting device might be a tablet computer or similar device with its own touchscreen display. The user can interact with the watch, e.g., by executing touch gestures on the touchscreen display and/or operating the other input device. As the user interacts with the watch, the watch can send event messages to the tablet computer. Each event message can identify the particular event type that occurred (e.g., a specific app being launched, a specific action within the app, etc.). The tablet computer can display explanatory information based on the received event messages. The explanatory information can be selected based on the specific action(s) of the user. For instance, if the user launches a specific app, explanatory information can include a description of the app, suggested actions the user can take within the app, and so on. If the user invokes a "quick info" functionality that gives quick access to selected information (e.g., current weather, next calendar appointment), explanatory information presented at the supporting device can include a list of information types that can be viewed using the quick info functionality, instructions for how to view other types of information using the quick info functionality, and/or instructions for how to access more complete information from a quick info display.

In some embodiments, the primary device can be a device that, in normal operation, interacts with a "companion" device. For example, a wearable device such as a watch might be designed to be paired with a user's phone, and the wearable device may rely on the phone to supply data (including real-time data), notifications, or the like to the wearable device and/or to receive communications from the wearable device (e.g., data requests or other event messages when the user interacts with the wearable device). In some embodiments of a tutorial system, the supporting device can also act as the companion device, allowing the primary device to function as it would during normal (non-tutorial) use and to provide a more realistic user experience. The supporting device can use a combination of dynamic data (e.g., local weather, stock quotes, or other information that can be obtained in real time via a network connection) and static data (e.g., sample contacts or calendar data that can be pre-loaded into the supporting device).

In some embodiments, the tutorial system can also operate in a "textbook" mode. In the textbook mode, the user can interact directly with the supporting device to obtain further information, explanations, etc. In some embodiments, the system can automatically switch back and forth between tutorial and textbook modes depending on whether the user is interacting with the primary device or the supporting device.

In some embodiments, a tutorial system can provide an interactive learning experience that is self-guided and self-paced. That is, decisions on what to do next are made by the user, who is not required to adhere to any particular schedule or sequence of operations.

The following detailed description together with the accompanying drawings will provide a better understanding of the nature and advantages of the present invention.

DETAILED DESCRIPTION

Certain embodiments of the present invention relate to tutorial systems that can facilitate user learning about a "primary" device by providing explanatory information on a "supporting" device while the user interacts with the primary device. The primary device can be a device of a particular type (e.g., a wearable device such as a watch). The supporting device can be a device of a different type (e.g., a tablet computer or the like). The use of a separate supporting device can allow explanatory information to be presented without obscuring any information presented at the primary device. In some embodiments, the supporting device can have a larger display than the primary device, allowing more explanatory information to be conveyed than would fit on a display of the primary device. In addition, in some embodiments, the primary device can operate exactly as it would in "normal" (non-tutorial) use, with all explanatory information being provided via the supporting device. This can allow the user to understand and experience realistic interactions with the primary device rather than with a "demo" version that may lack features or provide information that the primary device in a normal (non-tutorial) setting would not provide; at the same time, the user can receive information via the supporting device about a specific interaction the user is performing with the primary device, which can help the user learn how to operate the primary device.

Figure 1:
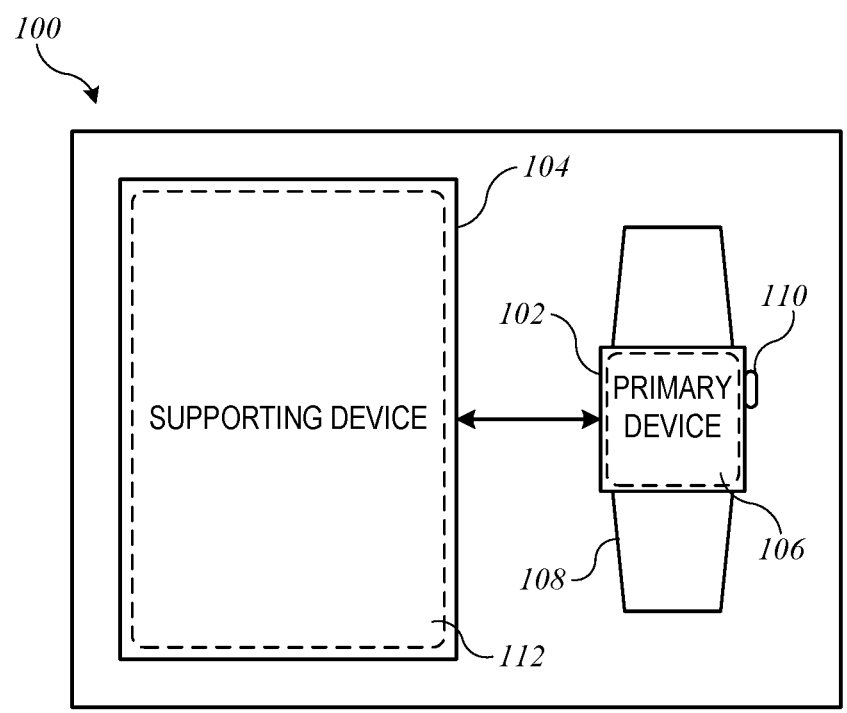
FIG. 1 is a simplified diagram showing a tutorial system according to an embodiment of the present invention.

FIG. 1 is a simplified diagram showing a tutorial system 100 according to an embodiment of the present invention. Tutorial system 100 can include a primary device 102 in communication with a supporting device 104.

In some embodiments, primary device 102 can be the subject of an interactive tutorial designed to teach the user about features and operation of primary device 102. For purposes of illustration, primary device 102 is shown as a watch-shaped device with a display portion 106 and a band portion 108; it is to be understood that a different device with a different form factor can be substituted.

A user can interact directly with primary device 102 in the same manner that the user would interact with primary device 102 outside of a tutorial setting. For example, primary device 102 can support a number of different functionalities by executing various software programs associated with those functionalities; examples include a clock-face function, a calendar functionality, a weather functionality, a messaging functionality, a media playback functionality, and so on. In some embodiments, display portion 106 of primary device 102 can implement a touchscreen display, and the user can interact with primary device 102 by touching display portion 106, in response to which primary device 102 can update an image presented at display portion 106. As another example, primary device 102 can include a control button/knob 110, and the user can provide input by pressing and/or turning control button/knob 110, in response to which primary device 102 can update an image presented at display portion 106. Other input and output operations can also be provided. During operation in tutorial system 100, primary device 102 can operate as it would outside a tutorial system, e.g., executing program code responsive to user input. Thus, tutorial system 100 can allow the user to directly experience interacting with primary device 102, rather than simply reading about it or watching demonstrations.

Supporting device 104 can be a different device that has a user interface capable of presenting information to a user (e.g., displaying visual information on a display, generating audio information through speakers, or the like). For purposes of illustration, supporting device 104 is shown as being a tablet computer with a touchscreen display 112, but other devices can be substituted. The presentation of information by supporting device 104 can be coordinated with user interactions with primary device 102. For example, as described below, when a user interacts with primary device 102, primary device 102 can send an event message (or event report) to supporting device 104. The event message can include information about the particular interaction event, including any or all of what application is executing at primary device 102, the type of user input received, an action taken by primary device 102 in response to the user input, and so on. Responsive to the event message, supporting device 104 can select explanatory information to be presented at its own local interface (e.g., displayed at touchscreen display 112). Explanatory information can include, for example, a description of what is displayed on primary device 102, instructions or suggestions for a next operation the user can perform, information about related features or options, and so on.

Figure 2A:
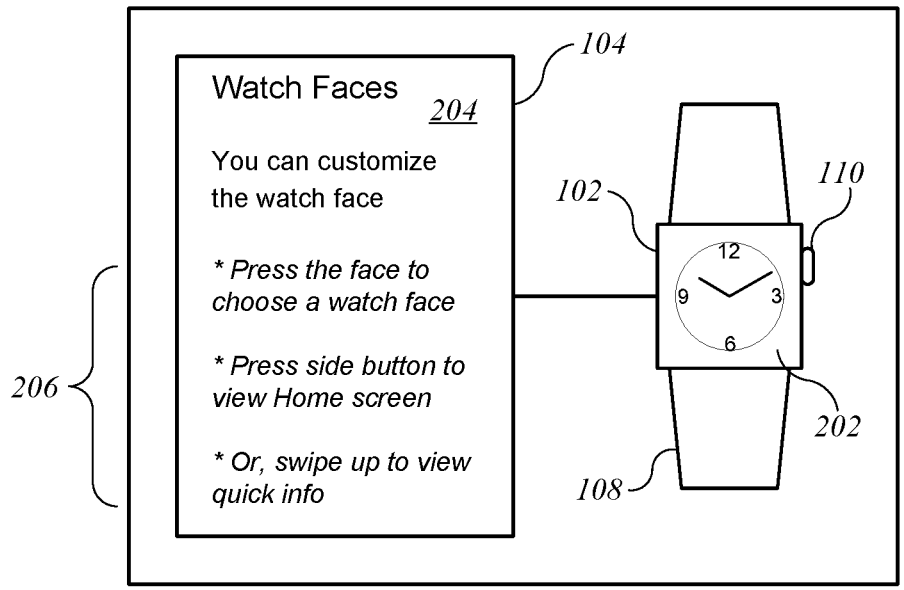
FIGS. 2A-2G show an example of interactive tutorial operation using a tutorial system according to an embodiment of the present invention.

FIGS. 2A-2G show an example of interactive tutorial operation using system 100 according to an embodiment of the present invention. FIG. 2A shows an initial configuration that can be presented, e.g., when the user initiates interaction with system 100. For example, the user might press control button/knob 110. This can result in primary device 102 presenting its initial wake-up screen, in this case a watch face 202. In addition, primary device 102 can send an event message to supporting device 104 to report that primary device 102 is now awake and displaying watch face 202. Supporting device 104 can respond by presenting information screen 204. Information screen 204 in this example gives the user additional information about watch face 202 and provides a list of suggested actions 206 that the user can perform. It should be noted that at any point in the tutorial presentation, the user can perform any action supported by primary device 102, including any of the suggested actions or, in some instances, an action other than a suggested action. Regardless of what the user chooses to do, primary device 102 can send a corresponding event message to supporting device 104, and supporting device 104 can select information to display based on the received event message. This allows the user to control the tutorial presentation rather than being constrained to follow a preset script.

Figure 2B:
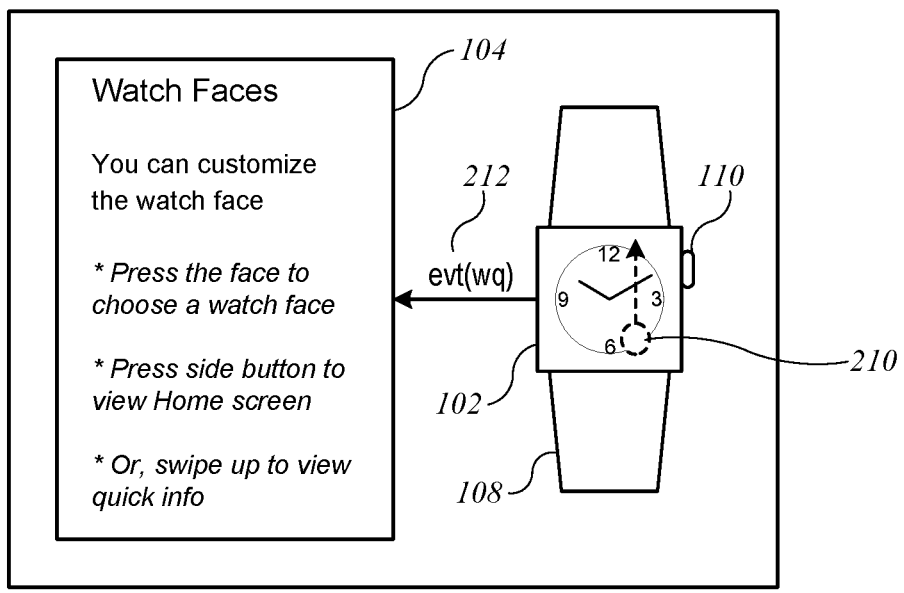
Figure 2C:
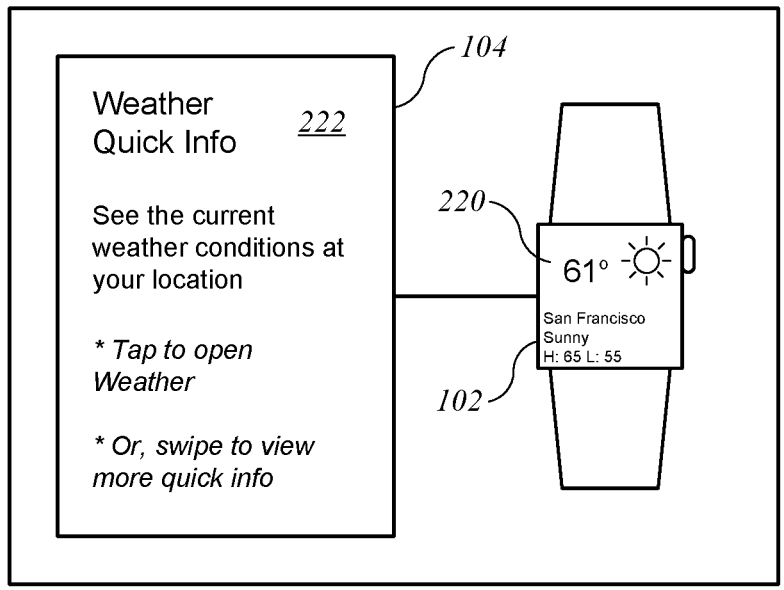

For example, as shown in FIG. 2B, the user can execute swipe-up gesture 210 on face portion 106 of primary device 102. In response, primary device 102 can send an event message 212 to supporting device 104. Event message 212 can include an event type identifier (e.g., "wq") indicating that primary device 102 is switching from the watch-face display to a "quick info" display. As shown in FIG. 2C, in response to gesture 210, primary device 102 can also replace the displayed watch face 202 with a quick info display 220 (in this case showing current local weather conditions). Concurrently, in response to event message 212, supporting device 104 can present explanatory information 222 regarding quick info display 220. Explanatory information 222 can describe the information presented and suggest other actions the user can take. As previously noted, the user is not limited to the suggested actions. For example, at this point, the user can press control button/knob 110 to access a home screen. This option is not mentioned in explanatory information 222, but the user is not constrained to follow a preset script. Regardless of what the user chooses to do, primary device 102 can send a corresponding event message to supporting device 104, and supporting device 104 can select information to display based on the received event message.

In some embodiments, primary device 102 can determine the current weather conditions in the same manner that it would in normal (non-tutorial) use. For example, primary device 102 can have a GPS receiver or other onboard electronics to determine its current location and can communicate with a weather service via a data communication network (e.g., the Internet) to obtain current weather data for the current location. This operation can be performed in the tutorial mode as it would be during normal use.

As another example, primary device 102 can be configured to communicate with a companion device (e.g., using a short-range wireless communication channel such as Bluetooth). The companion device can include a GPS receiver or other onboard electronics to determine its current location and can communicate with a weather service via a data communication network (e.g., the Internet) to obtain current weather data for the current location, then report the data to primary device 102. In tutorial system 100, however, a companion device might not be present. Where this is the case, supporting device 104 can play the role of the companion device in addition to presenting explanatory information 222, thereby allowing primary device 102 to operate within tutorial system 100 as it would during normal (non-tutorial) use. Specific examples of a supporting device playing the role of a companion device are described below.

Figure 2D:
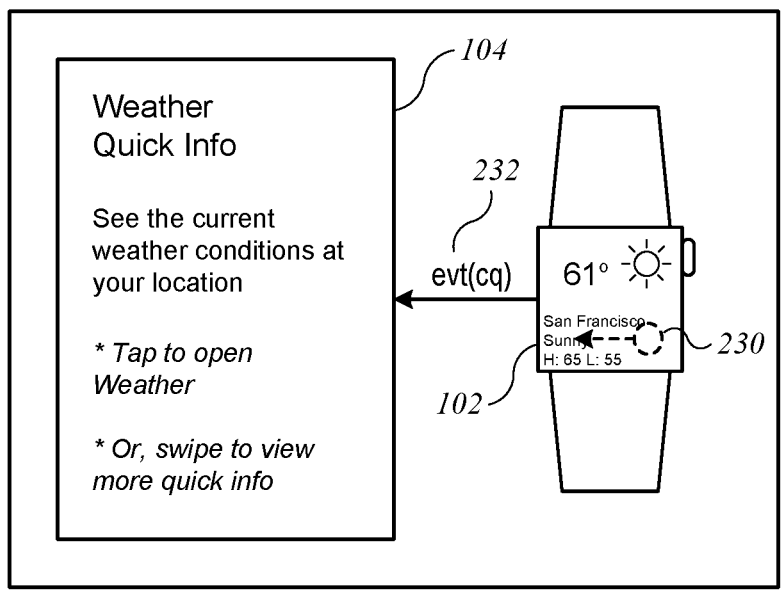
Figure 2E:
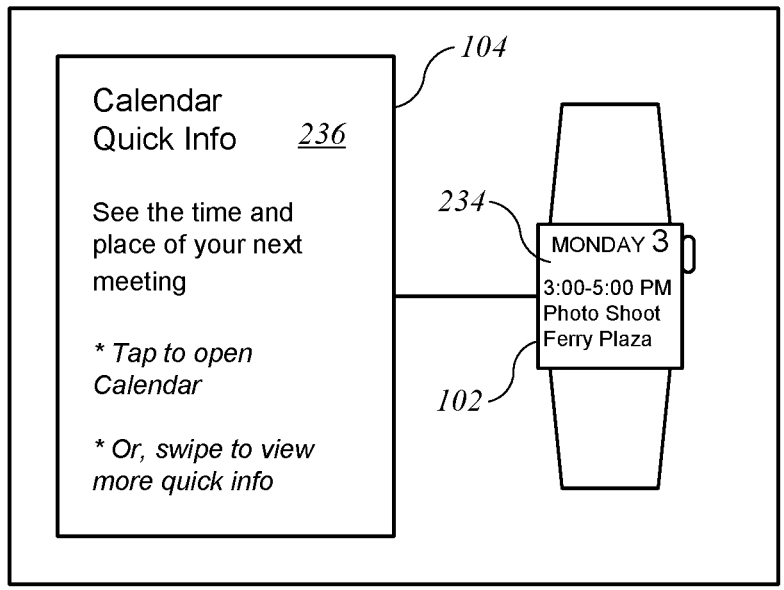

From the configuration of FIG. 2C, the user can, for example, perform a swipe-left gesture 230 as shown in FIG. 2D. In response, primary device 102 can send an event message 232 to supporting device 104. Event message 232 can include an event type identifier (e.g., "cq") indicating that primary device 102 is updating to a different quick-info display. Primary device 102 can also update its display as shown in FIG. 2E to show quick info screen 234. In this example, quick info screen 234 can provide information about an upcoming scheduled event (e.g., the next event) on the user's calendar. In response to event message 232, supporting device 104 can update its display to show explanatory information 236. Explanatory information 236 can describe the information presented and suggest other actions the user can take. As previously noted, the user is not limited to the suggested actions.

In some embodiments, primary device 102 can have a local store of calendar data from which to generate screen 234. In some embodiments where primary device 102 would normally (in a non-tutorial setting) obtain the calendar data from a companion device, supporting device 104 can play the role of the companion device in addition to presenting explanatory information 236. For instance, if the companion device would normally maintain a local store of the user's calendar data, supporting device 104 can maintain local calendar data (which can be sample data generated for tutorial purposes and need not be any user's actual data); if the companion device would normally retrieve the data in real time from a network, supporting device 104 can perform that operation. In some embodiments, even if the companion device would normally retrieve the data in real time from a network, supporting device 104 can just use a local data store. This can reduce network traffic and provide a faster response in the tutorial.

Figure 2F:
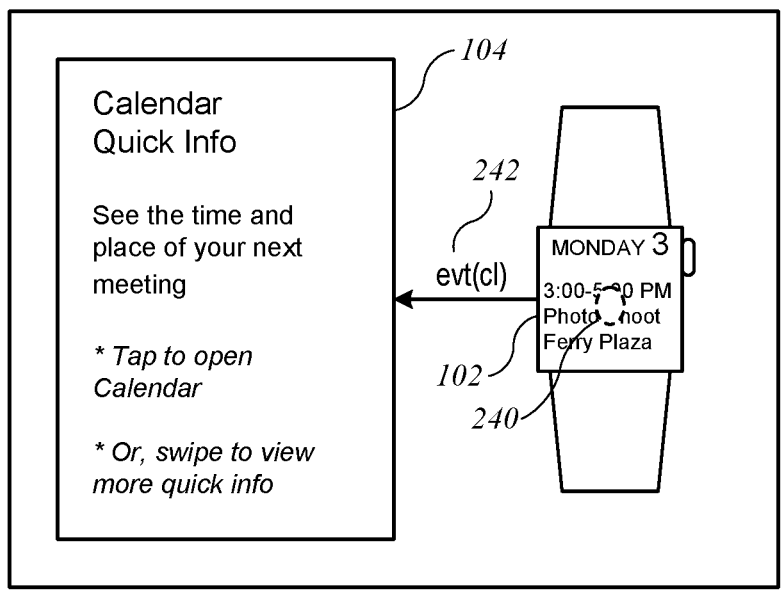
Figure 2G:
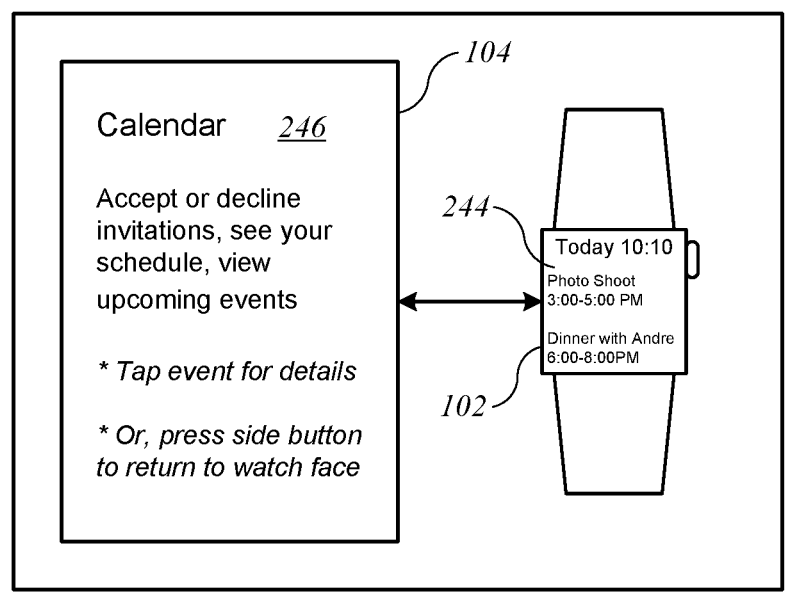

From the configuration in FIG. 2E, the user can, for example, execute tap gesture 240 as shown in FIG. 2F to launch the calendar app and see additional events and details. In response, primary device 102 can send an event message 242 to supporting device 104. Event message 242 can include an event type identifier (e.g., "cl") indicating that primary device 102 is launching the calendar app. Primary device 102 can also update its display as shown in FIG. 2G to show calendar information screen 244. In this example, calendar information screen 244 can provide a scrollable list of upcoming events on the user's calendar (e.g., in order of occurrence). In response to event message 242, supporting device 104 can update its display to show explanatory information 246. Explanatory information 246 can describe the information presented and suggest other actions the user can take. As previously noted, the user is not limited to the suggested actions.

Proceeding in this manner, the user can perform an arbitrary sequence of interactions with primary device 102. For each interaction, primary device 102 can send an event message to supporting device 104. The event message can include information identifying a particular event type (e.g., what type of information primary device 102 is now displaying, an app being launched or closed, etc.). Based on the event type, supporting device 104 can select from a library of explanatory information presentations. For example, a lookup table or the like can be used to map particular event types to presentations or elements of presentations. Further examples are described below. In some embodiments, supporting device 104 can also supply information to primary device 102 responsive to an event message; examples are described below.

It will be appreciated that the tutorial operation examples in FIGS. 2A-2G are illustrative and that variations and modifications are possible. Any type of information can be presented, in any sequence, responsive to the user's specific interactions with the primary device. Further, the primary device can include any type of device that supports user interactions and is not limited to a particular form factor, user interface, or functionality or combination of functionalities. Similarly, the supporting device can include any type of device capable of receiving event messages from the primary device and presenting information to a user. Various formats can be used to present information. While static visual presentations are shown herein for purposes of illustration, it is to be understood that other presentation formats can be used, including animations, video presentations, audio presentations, and so on, depending on the capabilities of a particular supporting device. In some embodiments, the user may be able to select among various presentation formats or options (e.g., enabling or disabling animations, audio, etc.). In some embodiments, the presentation can include a combination of elements in different formats (e.g., both text and video elements).

In some embodiments, the primary and supporting devices can be mounted to a single housing that can also contain other components, such as a power supply (e.g., a battery or power adapter or the like) to supply operating power to either or both of the primary and supporting devices. The connection between the devices can be wired or wireless as desired. Alternatively, the primary and supporting devices can be separate devices that can be connected using wired and/or wireless channels as desired. A particular physical arrangement is not required.

Figure 3:
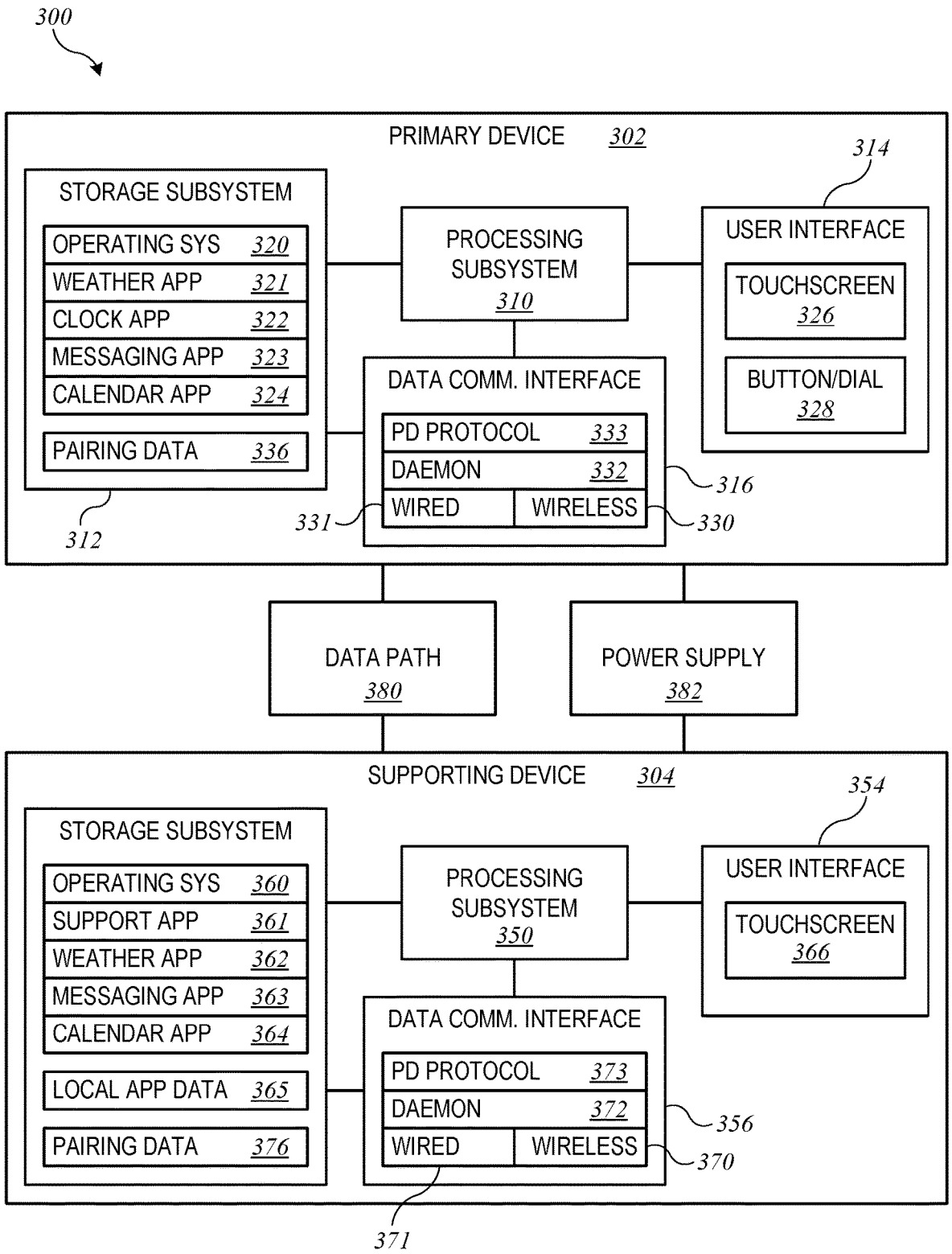
FIG. 3 is a simplified block diagram of a tutorial system according to an embodiment of the present invention.

FIG. 3 is a simplified block diagram of a tutorial system 300 according to an embodiment of the present invention. Tutorial system 300 can be, e.g., an implementation of tutorial system 100 with primary device 302 being an implementation of primary device 102 and supporting device 304 being an implementation of supporting device 104.

Primary device 302 can include a processing subsystem 310, storage subsystem 312, user interface 314, and data communication interface 316.

Processing subsystem 310 can be implemented using one or more integrated circuits of generally conventional or other designs (e.g., a programmable microcontroller or microprocessor with one or more cores). For example, processing subsystem 310 can include an applications processor, which can be the primary processor, and one or more coprocessors, such as a motion coprocessor that can detect and analyze movement of primary device 302. Storage subsystem 312 can be implemented using memory circuits (e.g., DRAM, SRAM, ROM, flash memory, or the like) or other computer-readable storage media and can store program instructions for execution by processing subsystem 310 as well as data generated by or supplied to primary device 302 in the course of its operations. In operation, processing subsystem 310 can execute program instructions stored by storage subsystem 312 to control operation of primary device 302. For example, processing subsystem 310 can execute an operating system 320 as well as various application programs (or "apps") specific to particular tasks, such as weather app 321 (which can, e.g., retrieve and display information about weather conditions), clock app 322 (which can, e.g., display the time using a customizable clock face, manage alarms, etc.), messaging app 323 (which can, e.g., send and receive messages such as email and/or SMS messages), and calendar app 324 (which can, e.g., allow the user to store, retrieve, and organize information about scheduled activities and events). It is to be understood that any number and combination of apps can be provided. In various embodiments, processing subsystem 310 can execute any processing tasks defined by program code, and a particular application or combination of applications is not required.

User interface 314 can incorporate hardware and software components configured to facilitate user interaction with primary device 302. Such components can be of generally conventional or other designs. For example, in some embodiments, user interface 314 can include a touchscreen interface 326 that can incorporate a display (e.g., LED-based, LCD-based, OLED-based, or the like) with a touch-sensitive overlay (e.g., capacitive or resistive) that can detect contact by a user's finger and/or other objects. By touching particular areas of the screen, the user can indicate actions to be taken, respond to visual prompts from the device, etc. User interface 314 can include other elements, such as a control button/dial 328 that allows the user to press and/or turn an externally accessible control element to provide input to primary device 302. In addition or instead, user interface 314 can include audio components (e.g., speakers, microphone); various buttons, knobs, and/or dials; haptic input or output devices; and so on.

Data communication interface 316 can incorporate hardware and software components configured to allow primary device 302 to communicate with various other devices. Data communication interface 316 can include a wireless communication interface circuit 330, a wired communication interface circuit 331, an interface daemon 332 that can be implemented using program code executing on a suitable processor, and a primary device (PD) protocol layer 333 that can also be implemented using program code executing on a suitable processor.

Wireless communication interface circuit 330 can include RF transceiver components such as an antenna and supporting circuitry to enable data communication over a wireless medium, e.g., using networks that comply with Wi-Fi® networking standards and protocols promulgated by the Wi-Fi Alliance (referred to herein as "Wi-Fi networks"), Bluetooth® communication protocols and standards promulgated by the Bluetooth SIG (including Bluetooth® Classic and/or Bluetooth® Smart communication protocols, referred to collectively herein as "Bluetooth communication"), or other protocols for wireless data communication. Wireless communication interface circuit 330 can be implemented using a combination of fixed-function hardware (e.g., driver circuits, antennas, modulators/demodulators, encoders/decoders, and other analog and/or digital signal processing circuits) and programmable processors provisioned with appropriate program code. In some embodiments, wireless interface circuit 330 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into wireless communication interface circuit 330.

Wired communication interface circuit 331 can include one or more connectors and supporting circuit components to enable data communication over a wired connection to another device, e.g., using electrical signals and/or optical communication techniques. Various wired protocols and transports can be supported; examples include USB, UART, and so on. Wired communication interface circuit 331 can be implemented using a combination of fixed-function hardware (e.g., driver circuits, modulators/demodulators, encoders/decoders, and other analog and/or digital signal processing circuits) and programmable processors provisioned with appropriate program code. Multiple different wired communication protocols and associated hardware can be incorporated into wired communication interface circuit 331.

Interface daemon 332 and PD protocol layer 333 can be implemented, e.g., using software executing on a programmable processor. In some embodiments, PD protocol layer 333 can expose an interface to operating system 320 and apps 321-324 that supports a proprietary communication protocol used by primary device 302. The protocol can include, for example, definitions of message formats for sending instructions and/or data to primary device 302 and/or for primary device 302 sending instructions and/or data to other devices (e.g., supporting device 304 and/or a companion device).

In some embodiments, interface daemon 332 can operate to make the choice of transport (e.g., the use of either wireless communication interface circuit 330 or wired communication interface circuit 331) transparent to all other components of primary device 302. For example, interface daemon 332 can expose a transport-agnostic interface to other components of primary device 302, including PD protocol layer 333. When PD protocol layer 333 receives an instruction from an app (e.g., weather app 321 or calendar app 324) to send a message (e.g., an event message as described above), PD protocol layer 333 can invoke a function of interface daemon 332 to send the message. Interface daemon 332 can interact with wireless communication interface circuit 330 and/or wired communication interface circuit 331 to send the message on the appropriate communication channel.

In some embodiments, interface daemon 332 can also participate in initializing communication channels. For example, in normal (non-tutorial) use, primary device 302 may be designed for wireless communication, and interface daemon 332 can inactivate wired communication interface circuit 331 (e.g., by placing it into a minimal-power state). During tutorial operations, primary device 302 may be connected by a wired connection to supporting device 304, and interface daemon 332 can inactivate wireless communication interface circuit 332 (e.g., by placing it into a minimal-power state). In some embodiments, interface daemon 332 can determine whether to ignore the status of either or both of wired communication interface circuit 331 and/or wireless communication interface circuit 330. Examples are described below.

In some embodiments, primary device 302 can be configured to interoperate only with a device that has established a pairing with primary device 302. Establishing a pairing can include connecting to another device (e.g., a companion device or supporting device 304) and exchanging information that can later be used to verify that a reconnecting device is the paired device. This information can include, e.g., cryptographic data such as authentication certificates, public keys, a shared secret, or the like. Pairing data 336 can be stored in storage subsystem 312 and accessed, e.g., by interface daemon 332, whenever a device connects. Examples are described below.

Supporting device 304 can include processing subsystem 350, storage subsystem 352, user interface 354, and data communication interface 356.

Processing subsystem 350 can be implemented using one or more integrated circuits of generally conventional or other designs (e.g., a programmable microcontroller or microprocessor with one or more cores). Storage subsystem 352 can be implemented using memory circuits (e.g., DRAM, SRAM, ROM, flash memory, or the like) or other computer-readable storage media and can store program instructions for execution by processing subsystem 350 as well as data generated by or supplied to supporting device 304 in the course of its operations. In operation, processing subsystem 350 can execute program instructions stored by storage subsystem 352 to control operation of supporting device 304. For example, processing subsystem 350 can execute an operating system 360 as well as various apps specific to particular tasks, such as supporting app 361 to provide information presentations during tutorial system operations as described herein. In some embodiments, processing subsystem 350 can also execute other apps to allow supporting device 304 to act as a companion device to primary device 302; examples include weather app 362, messaging app 363, and calendar app 364. It is to be understood that any number and combination of apps can be provided. In various embodiments, processing subsystem 350 can execute any processing tasks defined by program code, and a particular application or combination of applications is not required. Storage subsystem 352 can also store local app data 365 that can be used in responding to requests for data from primary device 302; examples are described below.

User interface 354 can incorporate hardware and software components that facilitate user interaction with supporting device 304. Such components can be of generally conventional or other designs. For example, in some embodiments, user interface 354 can include a touchscreen interface 366 that incorporates a display (e.g., LED-based, LCD-based, OLED-based, or the like) with a touch-sensitive overlay (e.g., capacitive or resistive) that can detect contact by a user's finger and/or other objects. By touching particular areas of the screen, the user can indicate actions to be taken, respond to visual prompts from the device, etc. User interface 354 can include other elements, such as audio components (e.g., speakers, microphone); various buttons, knobs, and/or dials; haptic input or output devices; and so on.

Data communication interface 356 can incorporate hardware and software components configured to allow supporting device 304 to communicate with various other devices. Data communication interface 356 can include a wireless communication interface circuit 370, a wired communication interface circuit 371, an interface daemon 372 that can be implemented using program code executing on a suitable processor, and a primary device (PD) protocol layer 373 that can also be implemented using program code executing on a suitable processor.

Wireless communication interface circuit 370 can include RF transceiver components such as an antenna and supporting circuitry to enable data communication over a wireless medium, e.g., using Wi-Fi networks, Bluetooth communication, or other protocols for wireless data communication. In some embodiments, wireless interface circuit 370 can provide NFC capability. Wireless communication interface circuit 370 can be implemented using a combination of fixed-function hardware (e.g., driver circuits, antennas, modulators/demodulators, encoders/decoders, and other analog and/or digital signal processing circuits) and programmable processors provisioned with appropriate program code. Multiple different wireless communication protocols and associated hardware can be incorporated into wireless communication interface circuit 370.

Wired communication interface circuit 371 can include one or more connectors and supporting circuit components to enable data communication over a wired connection to another device, e.g., using electrical signals and/or optical communication techniques. Various wired protocols and transports can be supported; examples include USB, UART, and so on. Wired communication interface circuit 371 can be implemented using a combination of fixed-function hardware (e.g., driver circuits, modulators/demodulators, encoders/decoders, and other analog and/or digital signal processing circuits) and programmable processors provisioned with appropriate program code. Multiple different wired communication protocols and associated hardware can be incorporated into wired communication interface circuit 371.

Interface daemon 372 and PD protocol layer 373 can be implemented, e.g., using software executing on a programmable processor. These software layers can be similar to interface daemon 332 and PD protocol layer 333 of primary device 302 described above.

As noted above, in some embodiments, primary device 302 may be configured to interoperate only with a device that has established a pairing with primary device 302. In some embodiments, pairing data 376 can be stored in storage subsystem 352 to allow supporting device 304 to present itself to primary device 302 as a paired device. In some embodiments, pairing data blocks 336 and 376 can be established by performing a pairing operation between primary device 302 and supporting device 304. In other embodiments, pairing data blocks 336 and 376 can be loaded through a copying operation using pairing data from other devices; an example is described below.

In some embodiments, system 300 can include other components. For example, the connection between primary device 302 and supporting device 304 can be a wired connection, and data path 380 can include wire lines, cables, printed circuit boards, connectors, and/or other circuitry to establish the wired connection. Power supply 382 can supply power to primary device 302 and/or supporting device 304. Power supply 382 can include, for example, a battery or set of batteries, a power adapter that can be connected to an external power source (e.g., using a conventional power plug or the like), and/or other power supply components. In some embodiments, primary device 302 and/or secondary device 304 can have an internal battery in addition to or instead of relying on external power supply 382.

It will be appreciated that system 300 is illustrative and that variations and modifications are possible. In some embodiments, the components of system 300 can be packaged within a single housing, or the various devices and other components can be provided separately. The communication between the primary device and supporting device can be wired or wireless as desired.

Further, while the primary device and supporting device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

In some embodiments, the primary device can operate independently of the supporting device, except for the communication of event messages from the primary device to the supporting device, which can allow the supporting device to present explanatory information that is responsive to user interactions with the primary device.

Other embodiments can provide additional communications between the primary device and supporting device. For instance, as described above, the primary device may be designed such that in normal (non-tutorial) use, it would interoperate with a companion device that can support and/or extend the functions of the primary device. In one example, the primary device can be a wearable device such as a watch and the companion device can be a smart phone or similar device. The companion device can provide wide-area network connectivity (e.g., connectivity to data networks, cellular voice networks, etc.) and additional information storage and/or processing capability. The primary device can be designed to establish a pairing with the companion and to rely on the companion for retrieval of dynamic data via a wide-area network, sending or receiving of messages (e.g., SMS or email messages) via a wide-area network, connecting to a cellular voice network to make and receive telephone calls, and so on. In a tutorial system, however, a companion device might not be available.

In some embodiments, the supporting device can be configured to act, in at least some respects, as a companion device. Thus, for example, in any instance where the primary device in normal (non-tutorial) use would respond to a user input by requesting data from or invoking a function of the companion device, the tutorial system can allow the primary device to make the request as it normally would; the supporting device can receive and respond to the request in a manner that mimics the behavior of a companion device. For instance, a user input received at user interface 314 of primary device 304 can be interpreted by operating system 320 or any of apps 321-324, depending on the currently active context. The process (e.g., operating system 320) that interprets the user input can determine that data is needed from the companion device in order to respond. Operating system 320 can invoke a function of PD protocol layer 333 to send the request for data to the companion device, and PD protocol layer 333 can in turn invoke interface daemon 332. Interface daemon 332 can determine that supporting device 304 is available via wired communication interface circuit 331 and can format and route the request accordingly. Supporting device 304 can receive the request and respond via the same path. For example, as described below, supporting device 304 can fetch the requested data from local app data 365 or via a wide area network, then send the requested data to primary device 302 via wired communication interface circuit 372. When the response is received at wired communication interface circuit 331, interface daemon 332 can provide the response via PD protocol layer 333 to the requesting process (e.g., operating system 320). Thus, the absence of a companion device can be transparent to requesting processes on primary device 302.

In some embodiments, the primary device and/or supporting device can execute software processes that are specifically designed to enable tutorial system operations and that would not be available in devices provided for normal (non-tutorial) use, such as primary devices sold to end users through retail channels. For example, interface daemon 332 can be implemented in program code that is only loaded into instances of primary device 302 that are intended for tutorial use; such code might not be loadable into a non-tutorial instance of primary device 302. Similarly, interface daemon 372 and supporting app 361 can be implemented in program code that is only loaded into instances of supporting device 304 that are intended for tutorial use, and such code might not be loadable into a non-tutorial instance of supporting device 304. Thus, it might not be possible for a user to take an off-the-shelf primary device and operate it in a tutorial system with a supporting device as described herein; specially modified devices can be required.

In addition, the primary and/or secondary device may have modified components compared to devices provided for normal (non-tutorial) use. For instance, primary device 302 may normally be sold without a wired communication interface (e.g., connector or pins) and may communicate exclusively through a wireless interface. For use in a tutorial system, however, it may be desirable to modify the housing of primary device 302 to expose a wired communication interface. Thus, in various embodiments, primary device 302 and/or supporting device 304 can be modified versions of devices sold or distributed to users for normal (non-tutorial) use.

It should be noted that a supporting device in a tutorial system need not perform the same operations that a companion device would in normal (non-tutorial) use. For example, in response to a particular data request, a companion device might retrieve requested data by accessing a user account at a network service (e.g., a cloud-based storage service, media streaming service, or the like). However, in a tutorial system, it may be preferred to store "sample" data locally within supporting device 304 rather than actually accessing the user's account. This can allow a creator of tutorial content to provide examples selected for instructional value; it can also facilitate use of the tutorial system in cases where a network connection might not be available or where the user might not want to provide personal account information to the tutorial system.

In some embodiments where a primary device (e.g., primary device 102 of FIG. 1) would normally operate with a paired companion device, a pairing between primary device 102 and a supporting device (e.g., supporting device 104 of FIG. 1) can be established in the same way that the pairing with a companion device would normally be established. In other embodiments, a pairing can be created by copying complementary pairing data blocks into primary device 102 and supporting device 104 using a pairing established between other devices (e.g., a different primary device and a companion device).

Figure 4:
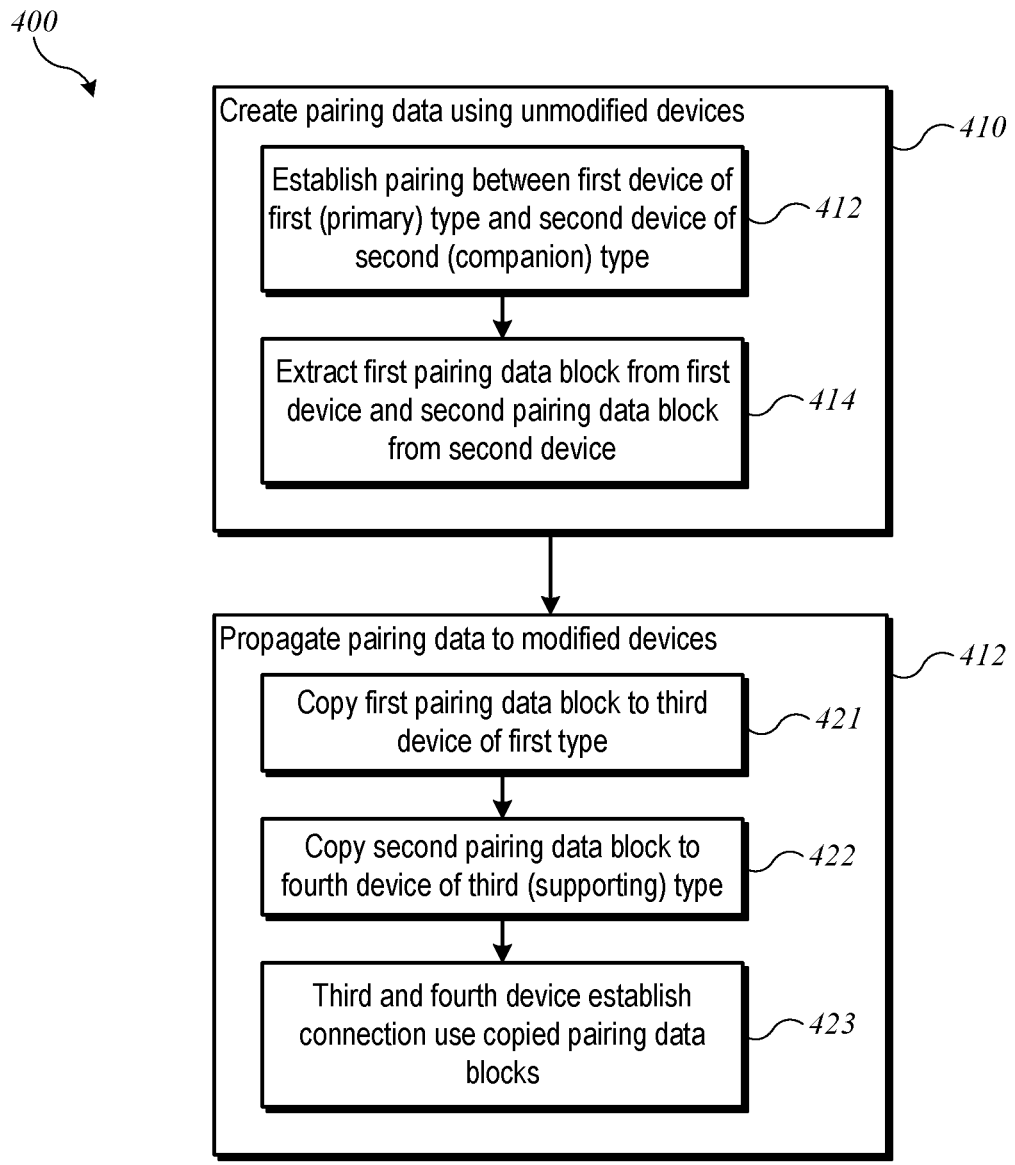
FIG. 4 is a flow diagram of a process for establishing a pairing between two devices in a tutorial system according to an embodiment of the present invention.
Figure 5A:
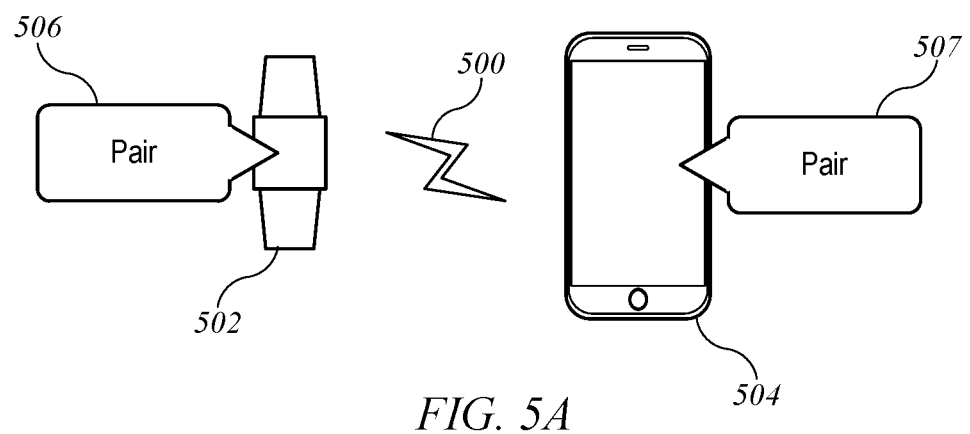
FIGS. 5A-5D are simplified diagrams illustrating various operations related to establishing a pairing according to an embodiment of the present invention.

FIG. 4 is a flow diagram of a process 400 for establishing a pairing between two devices (e.g., primary device 302 and supporting device 304) according to an embodiment of the present invention. FIGS. 5A 5D are simplified diagrams illustrating various operations of process 400. Process 400 includes obtaining a primary device and companion device and establishing a pairing, then extracting and copying the resulting pairing data blocks to a primary device 102 and supporting device 104 of tutorial system 100.

Referring to FIG. 4, in a first phase (block 410), a pairing is created using an "unmodified" primary device and an "unmodified" companion device. These unmodified devices can be regular production devices intended for normal (non-tutorial) use; as used herein, they are "unmodified" in the sense that they need not have any hardware or software adaptations specific to use in a tutorial system.

At block 412, a pairing is established between a first device (a primary device) and a second device (a companion device). For example, as shown in FIG. 5A, a primary device 502 (in this example, a watch, although other device types can be substituted) and a companion device 504 (in this example, a smart phone, although other device types can be substituted) can perform a pairing operation via a wireless communication channel 500. The pairing operation can include user input 506, 507 (e.g., an instruction or confirmation to make the pairing) at either or both devices. Establishing a pairing can involve a secure information exchange between devices 502, 504 that can allow devices 502, 504 to establish a cryptographic shared secret. In some embodiments, the secure information exchange can include an out-of-band information exchange, e.g., information presented on the display of primary device 502 and entered by the user via the user interface of companion device 504 or vice versa.

Figure 5B:
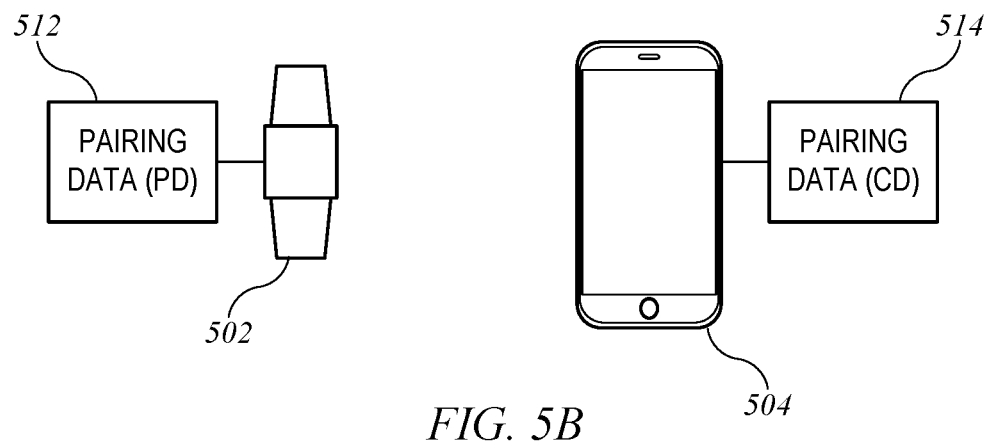

As shown in FIG. 5B, establishing the pairing can result in a pairing data block 512, 514 being stored in each device 502, 504. If the connection between devices 502 and 504 is subsequently lost, then pairing data blocks 512, 514 can be used by primary device 502 and companion device 504 upon reconnection to verify each other's identity. For instance, information stored in pairing data blocks 512, 514 can include, e.g., cryptographic data such as authentication certificates, public keys, a shared secret established during block 412, or the like. In some embodiments, the process of establishing a pairing is designed to include a random (unpredictable) element for which a valid value cannot be readily guessed or predicted, and establishing a pairing between actual devices may be the most reliable way to generate such an element.

Figure 5C:
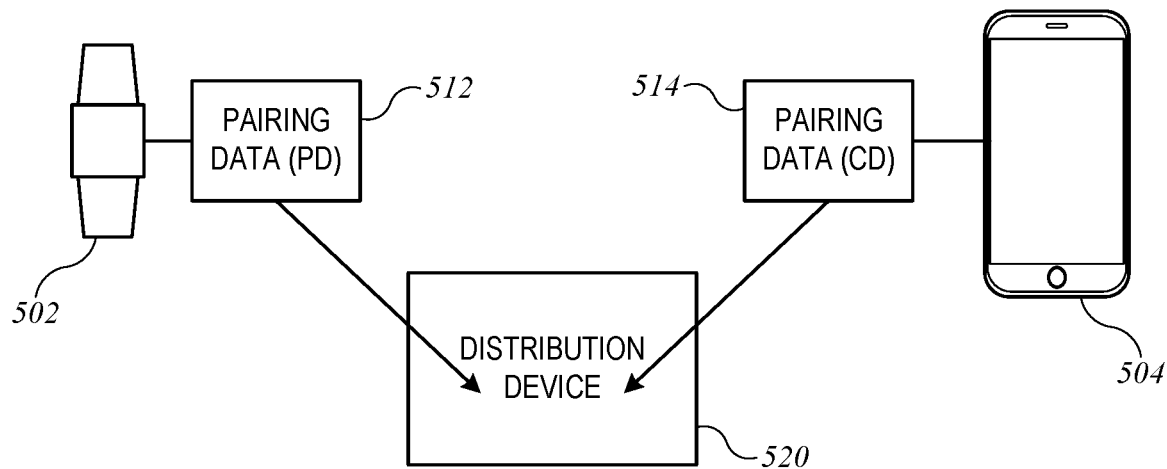
Figure 5D:
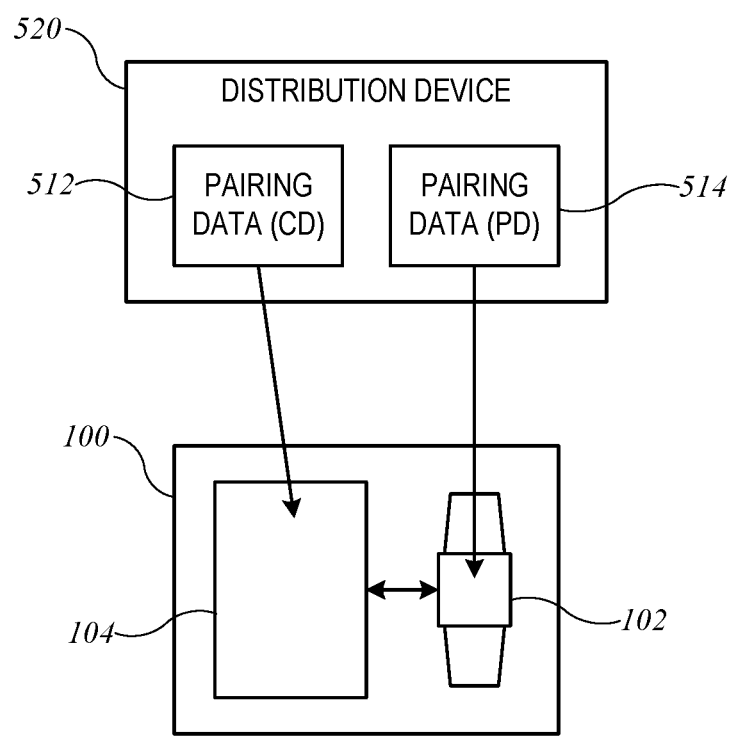

Referring again to FIG. 4, at block 414, a first pairing data block can be extracted from the first device and a second pairing data block can be extracted from the second device. Extracting the data blocks can include operating the devices in a special mode (e.g., a testing or debugging mode) that allows data blocks to be copied that would ordinarily not be extractable. For example, FIG. 5C shows that pairing data blocks 512, 514 can be extracted from primary device 502 and companion device 504 by a distribution device 520.

Referring again to FIG. 4, in a second phase (block 420), complementary pairing data blocks (e.g., pairing data blocks 512, 514) can be distributed to devices in a tutorial system (e.g., tutorial system 100 of FIG. 1). For example, at block 421, pairing data block 512 can be copied to a third device (e.g., primary device 102 of tutorial system 100), and at block 422, pairing data block 514 can be copied to a fourth device (e.g., supporting device 104 of tutorial system 100); these operations are shown in FIG. 5D. At block 423, the third device (e.g., primary device 102) and fourth device (e.g., supporting device 104) can establish a connection using their copies of pairing data block 512 or 514. As a result, primary device 102 and supporting device 104 can behave as if they had established a pairing with each other.

Figure 6:
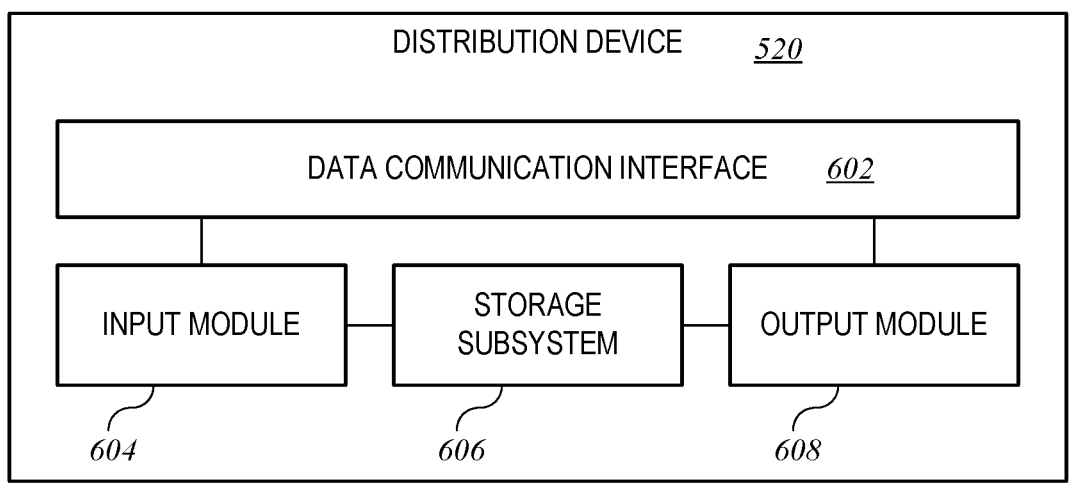
FIG. 6 is a simplified block diagram of a distribution device according to an embodiment of the present invention.

FIG. 6 is a simplified block diagram of distribution device 520 according to an embodiment of the present invention. Distribution device 520 can include a data communication interface 602, an input module 604, a storage subsystem 606, and an output module 608.

Data communication interface 602 can be configured to communicate with other electronic devices, including primary devices (e.g., primary device 502, 102), companion devices (e.g., companion device 504), and supporting devices (e.g., supporting device 104). Implementation of data communication interface 602 can be similar to data communication interfaces 316, 356 described above.

Input module 604, which can be implemented, e.g., as program code executing on a programmable processor, can operate to extract a pairing data block from a connected device (e.g., primary device 502 or companion device 504). For instance, input module 604 can implement block 414 of process 400 of FIG. 4. Input module 604 can store extracted pairing data blocks in storage subsystem 606.

Storage subsystem 606 can be implemented similarly to storage subsystems 312, 352 described above. In some embodiments, storage subsystem 606 can provide storage for one set of complementary pairing data blocks 512, 514. In some embodiments, storage subsystem 606 can store multiple sets of complementary pairing data blocks (e.g., obtained from different instances of paired primary and companion devices).

Output module 608, which can be implemented, e.g., as program code executing on a programmable processor, can operate to send a copy of a pairing data block stored in storage subsystem 606 to a destination device (e.g., primary device 102 or supporting device 104). In some embodiments, output module 608 can select the pairing block based on the type of device connected to data communication interface 602 (e.g., whether the connected device is a primary device or a supporting device). In some embodiments, data communication interface 602 can be configured to connect to a primary device 102 and supporting device 104 of the same instance of tutorial system 100 at the same time, and output module 608 can deliver complementary pairing blocks to the two devices. If storage subsystem 606 can store multiple sets of complementary pairing data blocks, then output module 608 can select a set for each tutorial subsystem using various selection techniques (e.g., random selection, round robin, or the like).

It will be appreciated that process 400 and distribution device 520 are illustrative and that variations and modifications are possible. Process steps described as sequential may be executed in parallel, order of steps may be varied, and steps may be modified, combined, added or omitted. For instance, the second phase (block 420) of process 400 can be executed repeatedly for any number of instances of tutorial system 100. In some embodiments, distribution device 520 can be connected successively or in parallel to multiple primary devices 102 and/or multiple supporting devices 104 and can send a copy of the appropriate pairing data block 512, 514 to each device. Reusing the same pairing data blocks can simplify the process of mass-producing tutorial systems.

Those skilled in the art with access to the present disclosure will appreciate that where the same pairing data blocks are copied to multiple primary and supporting devices, any primary device that receives a copy of pairing data block 512 may be able to connect with any supporting device that receives a copy of pairing data block 514. In some cases, this can simplify repair of a tutorial system. For instance, a primary device that fails can be replaced with a different primary device that has the same pairing data block. It is recognized that device confusion may occur if wireless connections are used in a setting where multiple tutorial systems 100 are concurrently within wireless communication range of each other, as a primary device from one tutorial system might inadvertently connect with a supporting device from a different tutorial system. However, if each tutorial system 100 uses a wired connection between primary device 102 and supporting device 104 and/or if the tutorial systems 100 are dispersed to disparate locations (out of wireless range of each other) before use, only one primary device will be able to pair with a particular supporting device and vice versa, and device confusion can be avoided. It is also to be understood that use of process 400 is not required; in some embodiments, the devices in a tutorial system can establish a pairing with each other, or a pairing might not be required for communication.

As noted above, once primary device 102 and supporting device 104 have received copies of pairing data blocks 512, 514 (or otherwise established a pairing), they can establish a connection (e.g., as indicated at block 423 of process 400). Establishing the connection can include mutual discovery or detection between the two devices (e.g., as described below), followed by verification of the pairing using pairing data blocks 512, 514. Depending on implementation, the connection can be made either via a wired or wireless channel. In the case of a wireless channel, the operation can be similar to operations primary device 502 and companion device 504 of FIG. 5B would normally perform to reconnect with each other after establishing a pairing.

Figure 7:
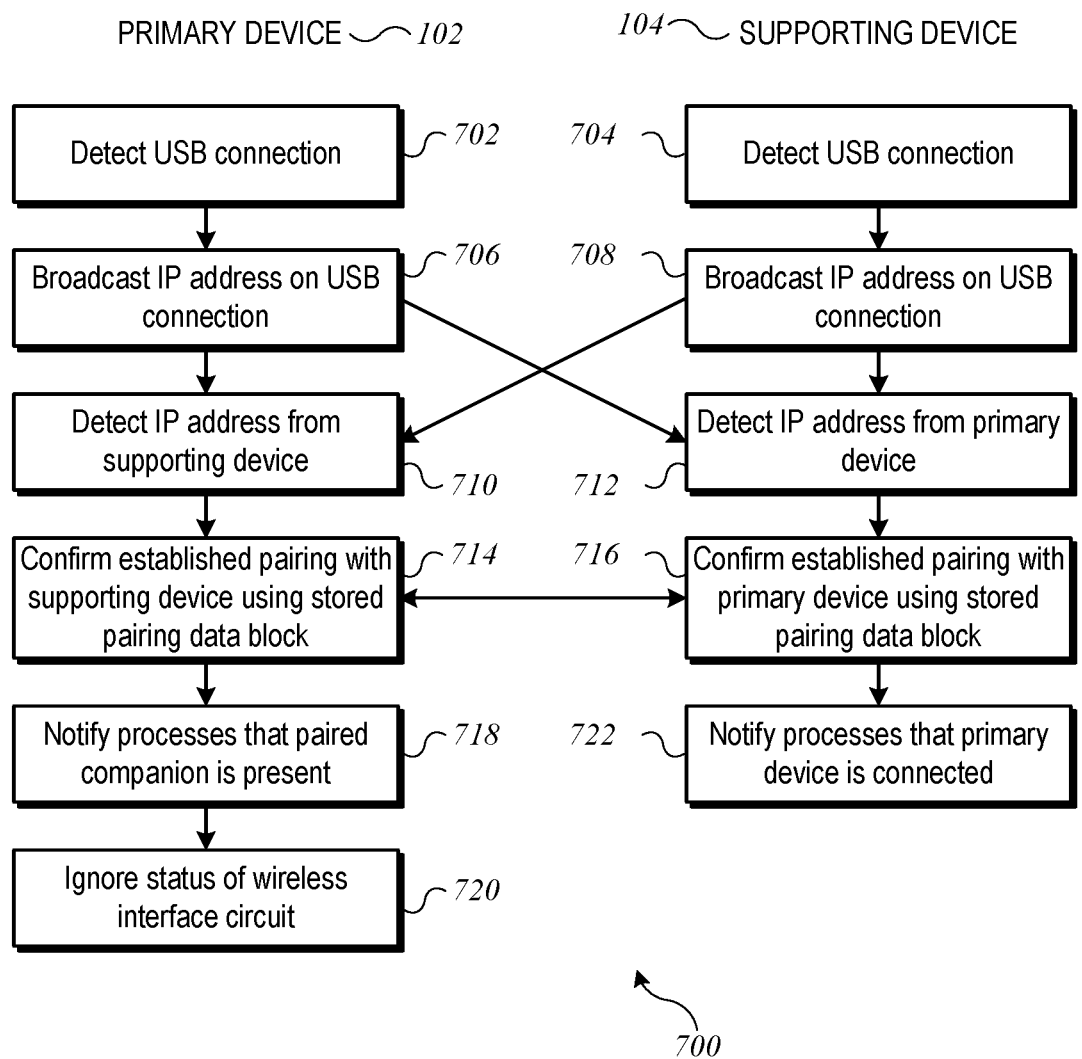
FIG. 7 is a flow diagram of a process for establishing a wired connection between a primary device and a supporting device in a tutorial system according to an embodiment of the present invention.

In the case of a wired channel, establishing a connection can include mimicking the presence of a wireless channel. FIG. 7 is a flow diagram of a process 700 for establishing a wired connection between a primary device (e.g., primary device 102) and a supporting device (e.g., supporting device 104) according to an embodiment of the present invention. USB is used as an example of a wired transport; other transports can be substituted. In the specific implementation of FIG. 3, primary-device portions of process 700 can be implemented, e.g., in interface daemon 332; supporting-device portions can be implemented, e.g., in interface daemon 372. Other implementations are also possible.

Process 700 can begin when primary device 102 and supporting device 104 are in an unconnected state. At blocks 702, 704, each device 102, 104 can detect the presence of a USB connection, e.g., at wired interface 331, 371. Standard USB device-detection techniques can be used. In some embodiments, one device (e.g., supporting device 104) can be configured as a USB host, or one device can be configured to dynamically switch from USB device mode to USB host mode when the connection is detected.

At blocks 706, 708, in response to detecting a USB connection, each device 102, 104 can broadcast its IP address on a USB communication channel. The IP address can be assigned statically or dynamically, as desired. At blocks 710, 712, each device 102, 104 can detect the broadcast IP address from the other device. It should be noted that blocks 702-712 can occur in any order, except that one device can detect an IP address from the other only after the other device has begun broadcasting.

At blocks 714, 716, after both devices 102, 104 have detected the other device's IP address, devices 102, 104 can confirm that a pairing was previously established. For instance, pairing data blocks 512, 514 previously obtained via process 400 can be used to confirm the pairing. The confirmation process can include, e.g., a cryptographic challenge/response operation. Primary device 102 can respond to a challenge from supporting device 104 using pairing data block 512, and supporting device 104 can use pairing data block 514 to verify the response. Conversely, supporting device 104 can respond to a challenge from primary device 102 using pairing data block 514, and primary device 102 can use pairing data block 512 to verify the response. Confirmation of a pairing can be performed regardless of whether devices 102, 104 obtained pairing data blocks 512, 514 through a standard pairing or as copies from distribution device 520. If the pairing is not confirmed, process 700 can abort (not explicitly shown).

Assuming the pairing is confirmed, at block 718, interface daemon 332 of primary device 102 can notify other processes executing at primary device 102 that a paired companion device is present. For instance, interface daemon 332 can communicate the notification to PD protocol layer 333, and PD protocol layer 333 can interact with other processes as if a companion device is present, even though supporting device 104 might be a different type of device from a companion device.

At block 720, interface daemon 332 can ignore any status reports from wireless communication interface circuit 330. For instance, during normal (non-tutorial) operation, interface daemon 332 may operate to alert PD protocol layer 333 of a disconnection if wireless communication interface circuit 330 reports no connection. But as long as supporting device 104 remains connected via wired communication interface circuit 331, the absence of a connection to wireless communication interface circuit 330 can be ignored. If wired communication interface circuit 331 becomes disconnected, then interface daemon 332 can alert PD protocol layer 333 of a disconnection.

At block 722, interface daemon 372 of supporting device 104 can notify other processes executing at supporting device 104 that paired primary device 102 is present. This can result, for instance, in supporting device 104 launching support app 361 in preparation for processing event messages that may be received from primary device 102.

Figure 8:
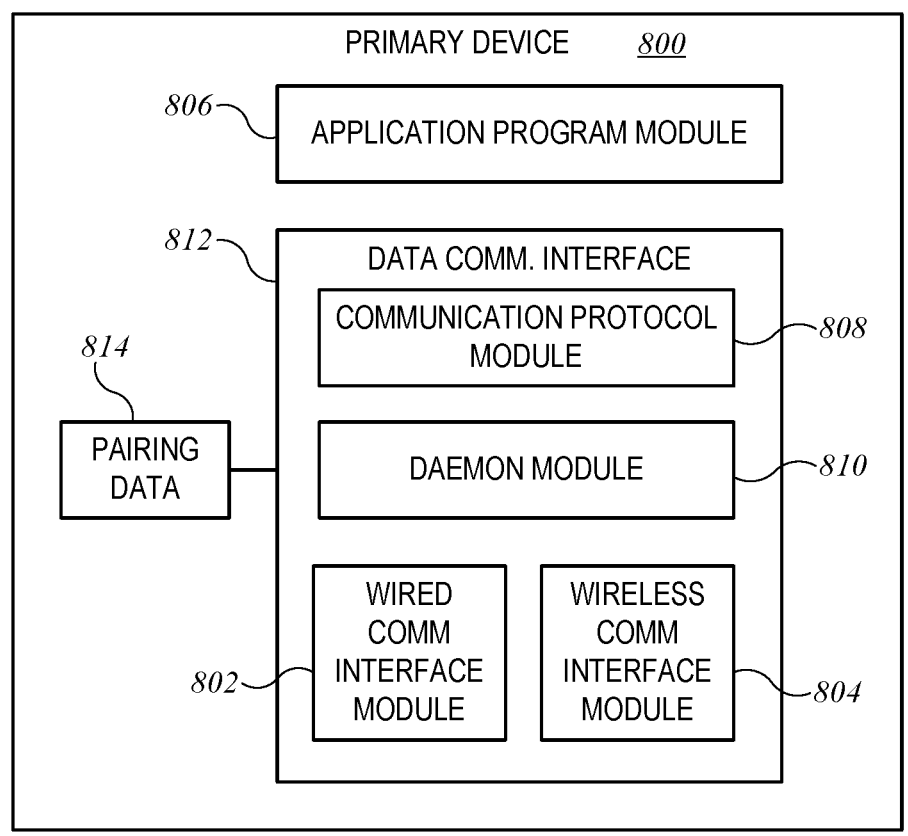
FIG. 8 is a simplified block diagram of a primary device according to an embodiment of the present invention.

FIG. 8 is a simplified block diagram of a primary device 800 (e.g., implementing primary device 102) according to an embodiment of the present invention. Primary device 800 can include wired communication interface module 802, wireless communication interface module 804, application program module 806, communication protocol module 808, and daemon module 810. Communication protocol module 808, daemon module 810, wired communication interface module 802, and wireless communication interface module 804 can be components of a data communication interface module 812, which can have access to a pairing data block 814 (which can be similar to pairing data block 512 described above).

Wired communication interface module 802 can be configured to communicate with another device (e.g., supporting device 104) via a wired connection. In some embodiments, wired communication interface module 802 can include wired communication interface circuit 331 of FIG. 3.

Wireless communication interface module 804 can be configured to communicate with another device via a wireless connection. In some embodiments, wireless communication interface module 804 can include wireless communication interface circuit 330 of FIG. 3.

Application program module 806 can be configured to execute one or more application programs (e.g., any or all of application programs 321-324 and/or operating system program 320 of FIG. 3). In some embodiments, execution of programs by application program module 806 can result in generation of event messages and/or requests for data, and application program module 806 can send the event messages and/or requests to data communication interface 812 (e.g., to communication protocol module 808).

Communication protocol module 808 can be configured to mediate communications between application program module 806 and wired communication interface module 802 and/or or wireless communication interface module 804. In some embodiments, communication protocol module 808 can include PD protocol layer 333 of FIG. 3.

Daemon module 810 can be configured to detect when wired communication interface module 802 has established a wired connection with another device (e.g., a supporting device) and to notify communication protocol module 808 that a wireless connection to a companion device has been established in response to detecting the wired connection. For example, daemon module 810 can interact with wired communication interface module 802 to execute blocks 704, 708, 712, 716, and 718 of process 700 described above. In some embodiments, daemon module 810 can include interface daemon 332 of FIG. 3.

It will be appreciated that process 700 and primary device 800 are illustrative and that variations and modifications are possible. Although not expressly shown, a supporting device can be implemented similarly to primary device 800. Process steps described as sequential may be executed in parallel, order of steps may be varied, and steps may be modified, combined, added or omitted. Other communication channels and transports can be substituted for USB, including other wired transports as well as wireless transports.

Once a connection has been established between a primary device and a supporting device, e.g., using process 700, tutorial operation can begin. In some embodiments, tutorial operation can be driven by user interactions with the primary device. For example, as described above with reference to FIGS. 2A-2G, primary device 102 can receive user input and respond to the user input by updating its own user interface and sending an event message to supporting device 104. Supporting device 104 can respond to the event message by updating its own user interface to present explanatory information related to the user interaction with primary device 102. In addition, supporting device 104 can act in the role of a companion device. For example, some (not necessarily all) user interactions with primary device 102 can result in primary device 102 requesting data; primary device 102 can send the request to supporting device 104, and supporting device 104 can return data to primary device 102 in response to received requests.

Figure 9:
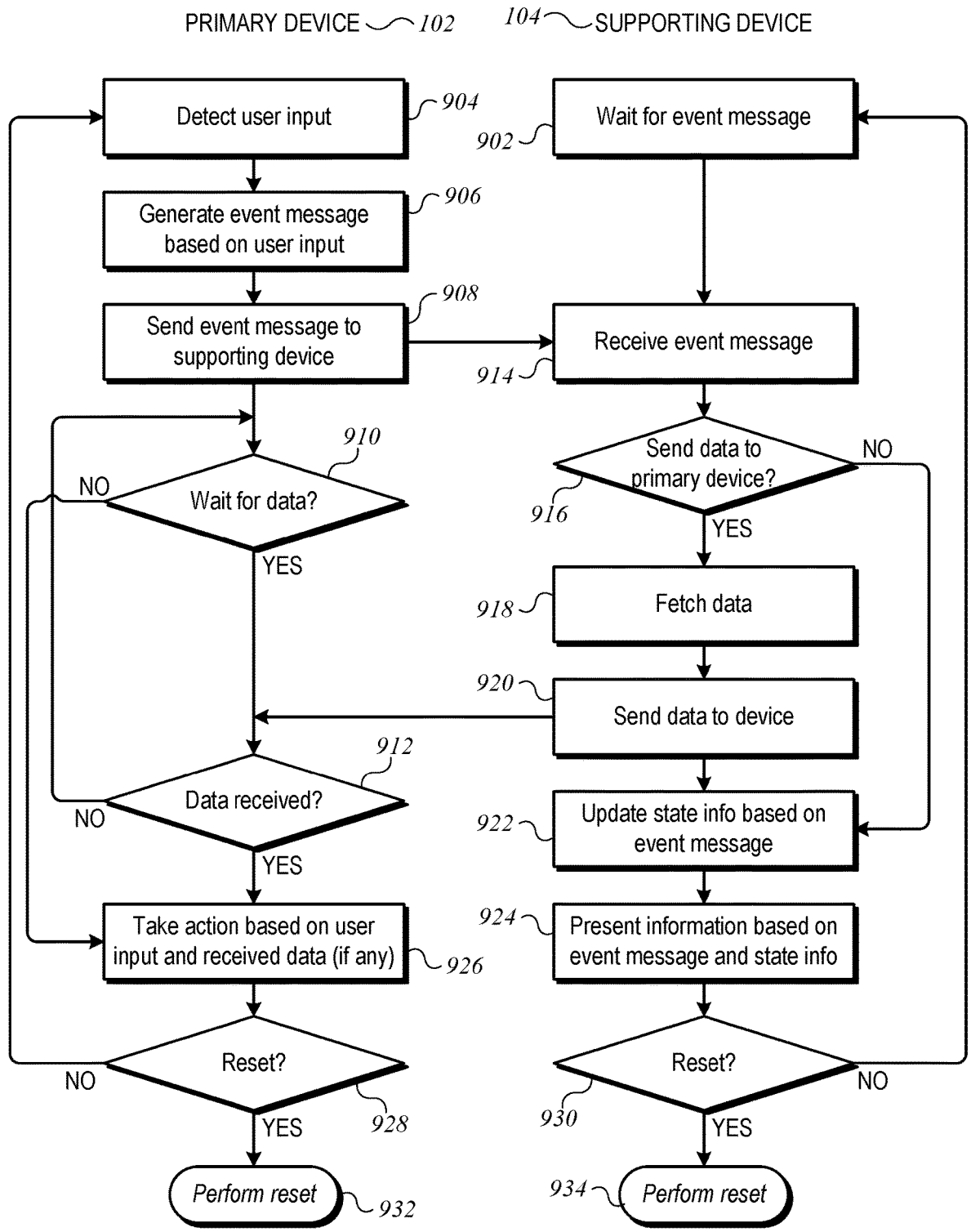
FIG. 9 is a flow diagram of a process for operating a tutorial system according to an embodiment of the present invention.

FIG. 9 is a flow diagram of a process 900 for operating a tutorial system (e.g., tutorial system 100) according to an embodiment of the present invention. Portions of process 900 can be performed by a primary device (e.g., primary device 102), and other portions of process 900 can be performed by a supporting device (e.g., supporting device 104).

Process 900 can begin after a connection has been established between primary device 102 and supporting device 104, e.g., using process 700 of FIG. 7 or another connection process. Once the connection is established, primary device 102 and supporting device 104 can enter an initialized state. For example, supporting device 104 can launch support app 361. Support app 361 can initialize the user interface of supporting device 104 to present an introductory message. The introductory message can include, e.g., text or an illustration prompting the user to interact with primary device 102. Supporting device 104 can then begin to wait for an event message at block 902.

For primary device 102, the initialized state can be similar or identical to an "idle" mode that primary device 102 would normally (i.e., during non-tutorial operation) enter after connecting to a paired companion device. In the context of tutorial operation, while primary device 102 is in the idle mode, it can present selected information to the user; examples include a "screensaver" image (e.g., an animated slideshow of various information screens), a home screen, a "watch face" displaying the time, any other information or image, or no information at all.

At block 904, primary device 102 can detect a user input at its user interface (e.g., a touch on touchscreen display 106, operation of control button/dial 110, etc.). Based on the user input, primary device 102 can generate an event message. The event message can include, e.g., an identifier of a type of event. The event-type identifier can specify a function invoked by the input. For example, in the case of event message 212 of FIG. 2B, the event-type identifier can specify that the user invoked a quick info functionality. In some instances, the event message can also include a request for data. For example, in the case of event message 212 of FIG. 2B, primary device 102 can determine that the first quick info item presented includes weather information, and event message 212 can include a request for current weather data. Other types of event messages might not include a data request; for example, from the presentation of FIG. 2A, if the user chooses to view the Home screen, primary device 102 can render the home screen image based on locally stored data. A data request (if applicable) can be combined with the event message or sent separately as desired. In some embodiments, a data request can subsume an event message; supporting device 104 can extract or infer an event type identifier from a data request based on the specific data requested and a current state of primary device 102 inferred from a sequence of event messages. In some embodiments, the event message can be a message that primary device 102 would generate and send to a companion device during normal (non-tutorial) operations; in some instances, the event messages can be specific to the tutorial mode and need not correspond to any message that primary device 102 would generate and/or send device during normal (non-tutorial) operations.

At block 908, primary device 102 can send the event message to supporting device 104. At block 910, if data was requested (in the event message or separately), primary device 102 can wait for the requested data to be received, until such time as data is received at block 912. In some embodiments, primary device 102 can cache any received data from supporting device 104 and can use cached data to respond to a future user input in the event that requested data is not received within a timeout period. Using cached data in some instances can prevent the tutorial from being slowed or otherwise impeded if requested data is unavailable.

At block 914, supporting device 104 can receive the event message sent at block 908. At block 916, supporting device 104 can determine whether to return data to primary device 102. For example, supporting device 104 can determine whether the received event message includes (or is) a request for data. If so, then at block 918, supporting device 104 can fetch the requested data.

Figure 10:
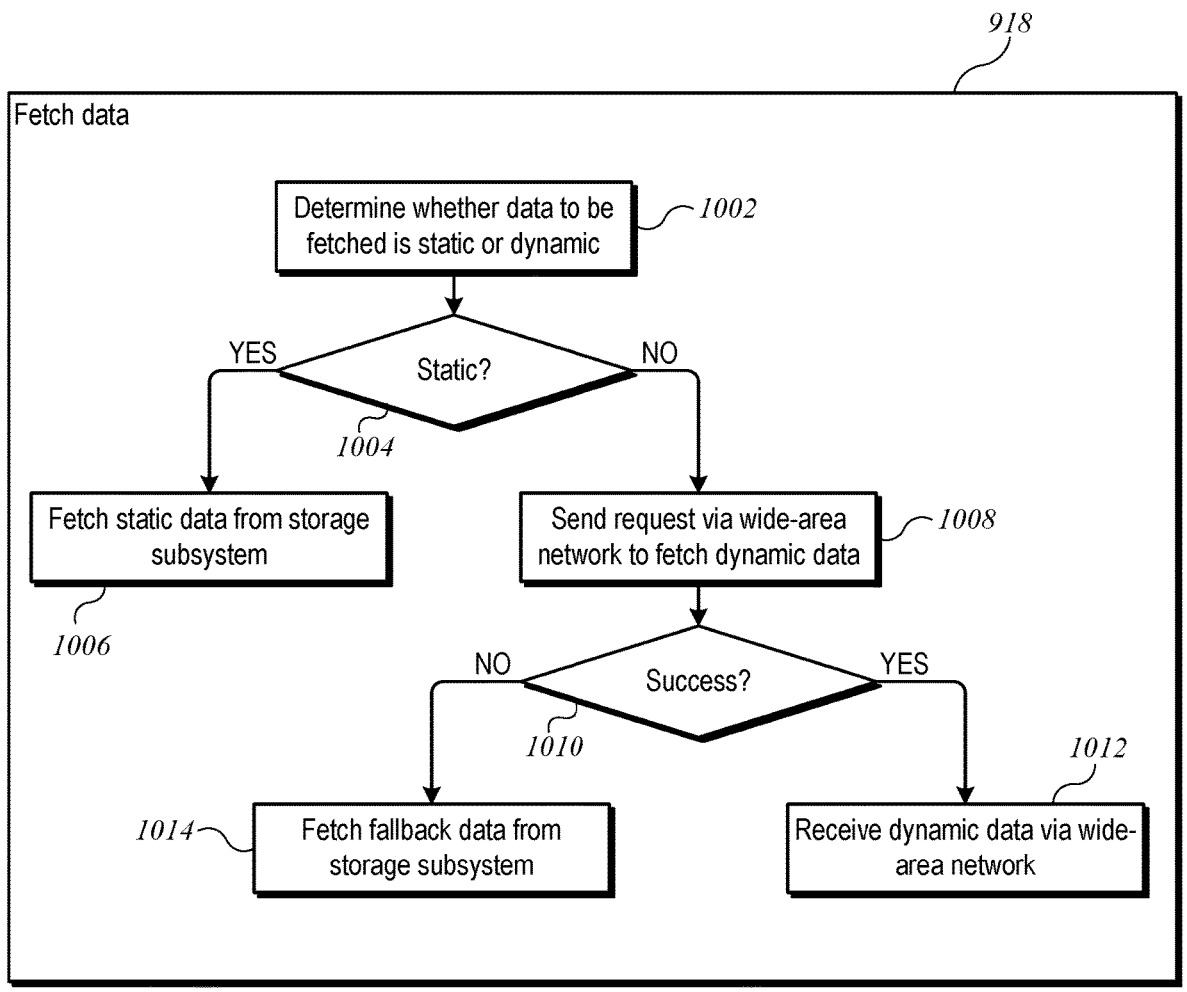
FIG. 10 is a flow diagram of a process for fetching data according to an embodiment of the present invention.

In some embodiments, data can be selectively fetched from either a local data store of supporting device 104 or from a remote source via a network. FIG. 10 is a flow diagram of a process for fetching data that can be implemented at block 918 of process 900 according to an embodiment of the present invention. At block 1002, supporting device 104 can determine whether the data to be fetched is static data or dynamic data. As used herein, "static" data can include data that has previously been created and stored in supporting device 104 for use during the tutorial presentation. "Dynamic" data can include time-varying data that can be obtained in real time, e.g., via a wide-area network. For example, for purposes of a tutorial, it may be desirable to demonstrate use of the primary device to view and manipulate personal data, but it may not be practical (or advisable) to obtain an actual user's personal data. Accordingly, it may be desirable to use fictitious personal data that has nothing to do with any particular user of the tutorial system but is designed to illustrate operation of the primary device. Examples of personal data include a sample calendar populated with events; a sample list of contacts populated with names, photos, phone numbers, etc.; samples of received messages (e.g., email and/or text messages); samples of user activity data (e.g., daily calorie count, minutes of exercise); and so on. All such fictitious personal data can be treated as static data that is created and stored in supporting device 104 in advance of a tutorial session. Other types of data that are not specific to a particular user but are variable with time can be treated as dynamic data. Examples include weather data, which can be updated in real time to reflect current weather conditions at the location of tutorial system 100; stock quotes; sports scores; etc. Treating non-personal data as dynamic can allow the user to experience the real-time information presentation capability of primary device 102.

At block 1004, the data is static, then at block 1006, supporting device 104 can fetch the static data from its local storage subsystem (e.g., from local app data store 365 of FIG. 3).

If, at block 1004, the data is dynamic, then at block 1008, supporting device 104 can send a request via a wide-area network to fetch the dynamic data. For instance, referring to FIG. 3, wired communication interface circuit 372 can be used for the connection to primary device 102, as described above. Concurrently, wireless communication interface circuit 374 can be used to establish a connection to a network, e.g., a Wi-Fi network, via which supporting device 104 can access data retrieval services available on a wide area network such as the Internet. For example, if the data to be fetched includes weather data, supporting device 104 can determine its location (e.g., using an onboard GPS receiver or the like) and send a request to a weather information service to obtain data describing current local weather conditions. In some embodiments, the request can include a request for data that has not (yet) been requested by primary device 102 but for which a request is foreseeable. For example, if the request is for current local weather data, it may be foreseeable that the user's next action will result in a request for a local weather forecast, and supporting device 104 can request the forecast data along with the current data.

At block 1010, supporting device 104 can determine if the network request was successful. If, so then at block 1012, the dynamic data is received via the wireless network. If not, in some embodiments, supporting device 104 can retry the request (not shown). Some embodiments may provide for supporting device 104 to store "fallback" data to be used in the event that a dynamic request fails (after one or more attempts), and at block 1014, supporting device 104 can fetch the fallback data from its local storage subsystem. For example, every time supporting device 104 successfully receives dynamic data from the network, supporting device 104 can cache the received data as fallback data (e.g., within local app data store 365) to be used in case the next request for the same type of data fails. For tutorial purposes, having primary device 102 present fallback information that might be inaccurate or outdated may be preferable to presenting no information at all; the user can understand that tutorial system 100 is presenting information for tutorial purposes and that the information is not necessarily accurate.

Process 1000 is just one example of a process that can be used for fetching data at block 918; other processes can be substituted. For example, all data can be treated as static and retrieved from a local data store; if desired, the local data store can be refreshed or updated from time to time via wide-area network requests (which can be independent of user activity). Alternatively, all data can be treated as dynamic and retrieved in real time from a network. In some embodiments, a single data request can include multiple data elements, including a combination of static and dynamic data elements, and supporting device 104 can fetch the static elements from its local data store and request the dynamic elements via a network.

Referring again to FIG. 9, after fetching data at block 918, at block 920, supporting device 104 can send the fetched data to primary device 102. At block 922, supporting device 104 can update state information for the tutorial presentation based on the received event message. In some embodiments, the state information is used to model the current state of primary device 102 based on the actions the user has executed to date. The state information can include, e.g., a history of received event messages and/or a sequence of primary-device states inferred from the event messages. At block 924, supporting device 104 can present information (e.g., display an image) based on the received event message and the state information. For example, the various displays of explanatory information shown in FIGS. 2A-2G can be dynamically created based on user actions. If the user has previously seen explanatory information about a particular state (e.g., the primary device is in a state for the second or third time), the information presented can be different on the second and subsequent presentations. For instance, the suggested actions might change to feature an action the user has not previously taken. In some instances, the suggested actions or other aspects of the presentation may be varied based on the path by which the user navigated to a particular state of primary device 102. This allows the presentation to be driven by the user, while at the same time the user can be guided toward learning about different features of the primary device.

Referring to blocks 910 and 912, once primary device 102 has received any data for which it is waiting, primary device 102 can proceed to block 926 and take action based on the user input detected at block 904 and the data (if any) received at block 912. The action can include invoking a function (e.g., launching an app), updating or replacing a graphical user interface image, etc.

In some embodiments, primary device 102 and supporting device 104 can be configured such that blocks 924 and 926 are executed at approximately the same time. For example, if supporting device 104 is fetching data for primary device 102, execution of block 924 can be deferred until the data has been fetched and sent at block 920. Keeping the devices in sync in this manner can facilitate user understanding of the presented information.

At blocks 928 and 930, primary device 102 and supporting device 104 can determine whether a reset event has occurred. A reset event can occur, for instance, if the user expressly exits the tutorial or ceases to interact with primary device 102. For example, supporting device 104 can implement a timeout feature such that, after execution of block 924, if a timeout period (e.g., 30 seconds, 1 minute, 5 minutes, or the like) elapses without receiving any further event messages, then a reset occurs. In some embodiments, supporting device 104 can send a reset message to primary device 102 in response to determining that a reset should occur. Other conditions can also trigger a reset event. If a reset occurs, then at blocks 932 and 934, primary device 102 and supporting device 104 can perform reset processing; an example of reset processing is described below.

If a reset event does not occur, then process 900 can continue execution, with primary device 102 receiving user input and sending event messages to supporting device 104 based on the user input. Execution of process 900 can continue indefinitely, allowing the user to explore any or all features and operations of primary device 102. In some embodiments, some interactions with primary device 102 may result in primary device sending data to supporting device 104. Depending on implementation, supporting device 104 can use, store, or ignore such data.

Figure 11:
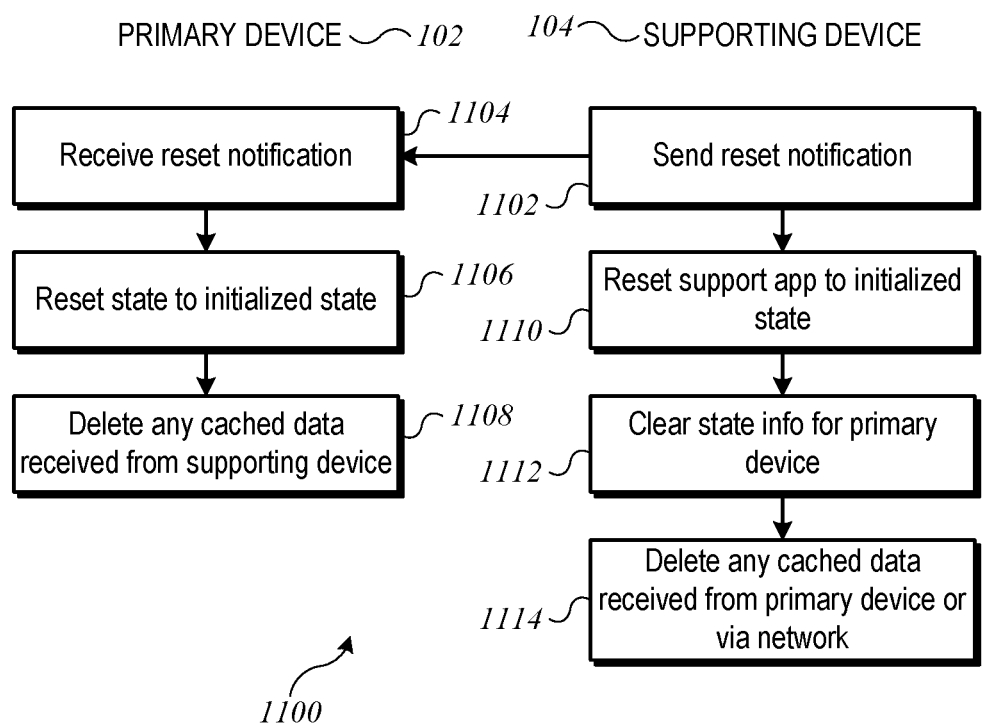
FIG. 11 is a flow diagram of a process for performing a reset in a tutorial system according to an embodiment of the present invention.

FIG. 11 is a flow diagram of a process 1100 for performing a reset in a tutorial system (e.g., tutorial system 100) according to an embodiment of the present invention. Portions of process 1100 can be performed by a primary device (e.g., primary device 102), and other portions of process 1100 can be performed by a supporting device (e.g., supporting device 104). In some embodiments, process 1100 can be performed at blocks 932 and 934 of process 900 described above.

Process 1100 can begin at block 1102, where supporting device 104 can send a reset notification to primary device 102; primary device 102 can receive the reset notification at block 1104. A reset notification can be sent in response to a timeout, e.g., as described above. Other conditions may also result in sending a reset notification, e.g., if the connection is lost and restored, if primary device 102 sends an unexpected event message (e.g., a message not consistent with the state information maintained by supporting device 104), or the like. In some embodiments, the reset notification can be sent by initiating a reset of the connection between the devices. Other reset notifications can also be used. In addition or instead, in some embodiments, primary device 102 can send a reset notification that can be received by supporting device 104. Exchanging a reset message when either device determines a reset is needed can help to keep the two devices in sync during tutorial operations, so that the presentation continues to make sense to the user.

Reset operations by primary device 102 can include resetting its internal state to an initialized state at block 1106. As noted above, the initialized state for primary device 102 can be similar or identical to an "idle" mode that primary device 102 would normally (i.e., during non-tutorial operation) enter after connecting to a paired companion device and can include presenting selected information (or no information) to the user. At block 1108, primary device 102 can delete any cached data that may have been previously received from supporting device 104 or stored in response to user input. Deleting cached data can result in the tutorial effectively starting over after a reset.

Reset operations by supporting device 104 can include resetting support app 361 to its initial state (or relaunching— support app 361) at block 1110. As described above, support app 361 can initialize the user interface of supporting device 104 to present an introductory message. At block 1112, supporting device 104 can clear its store of state information for the primary device (e.g., the record of previous event messages or primary device states described above), on the assumption that primary device 102 is returning to its initial state, which can render previous user operations or events irrelevant. At block 1114, supporting device 104 can delete data it may have cached from the network and/or from the primary device. Deleting cached data can result in the tutorial effectively starting over after a reset. In some embodiments, supporting device 104 can proceed to obtain and cache new data in place of the deleted data, or supporting device 104 can obtain and cache new data in response to event messages from primary device 102.

In some embodiments, reset processing can include additional operations. For example, in the course of operating tutorial system 100, a user may be able to modify data stored by various apps, e.g., creating a new appointment in the calendar app. It may therefore be desirable to reset locally stored data on one or both devices based on a canonical data set. For instance, supporting device 104 can maintain a read-only "master" copy of local app data store 365 as well as an "active" copy that is subject to modification during tutorial operations. During reset processing, supporting device 104 can replace the active copy with the read-only master copy, thus effectively erasing any changes the user may have made to app-related data, while still allowing the user to invoke data modification functions of primary device 102. In some embodiments, primary device 102 can reset any locally stored data, e.g., by deleting or invalidating the locally stored data requesting new data from supporting device 104. Such requests can occur at reset time or on an as-needed basis, driven by user interactions with primary device 102. Alternatively, depending on implementation, supporting device 104 can push selected data to primary device 102 after a reset.

In this manner, reset processing can allow tutorial system 100 to start "fresh" for a different user, or a user can return tutorial system 100 to its initial state at any time.

Tutorial system 100 as described above can allow a user to learn about primary device 102 by interacting directly with primary device 102 and observing its responses while being presented with additional explanatory information via supplemental device 104. This can provide an effective learning experience. However, in some instances, the user may want to learn about primary device 102 indirectly, e.g., by reading descriptions or watching video presentations demonstrating various features, options, etc.

Accordingly, certain embodiments of the present invention allow tutorial system 100 to operate in a second mode, referred to here as a "textbook" mode, in addition to the "tutorial" mode described above. The user can select whether tutorial system 100 should operate in textbook mode or tutorial mode and can freely switch between modes, which can further customize and enhance the learning experience.

Figure 12:
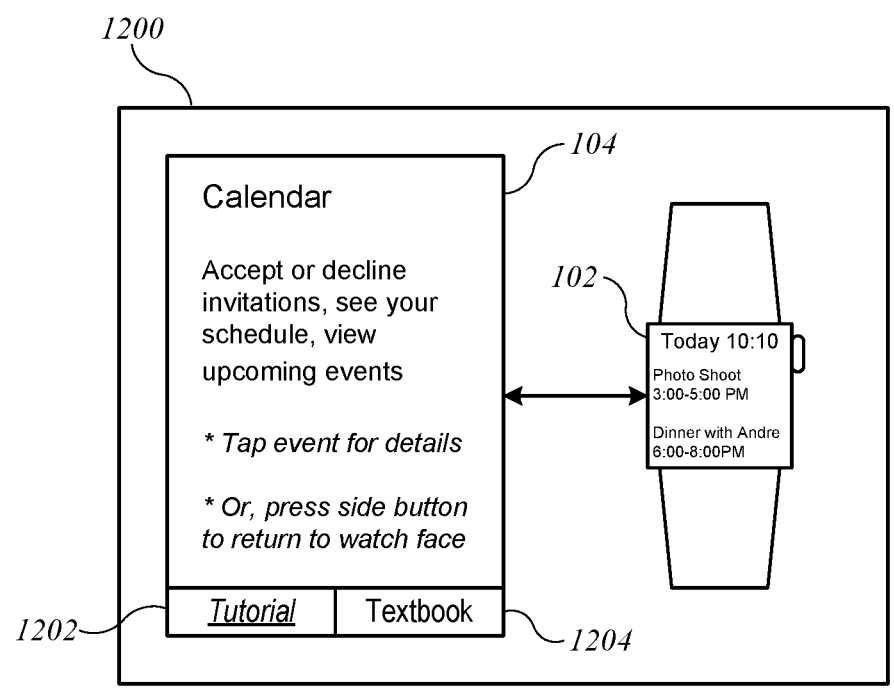
FIG. 12 shows an example of a tutorial system that supports tutorial and textbook modes according to an embodiment of the present invention.

FIG. 12 shows an example of a tutorial system 1200 that supports tutorial and textbook modes according to an embodiment of the present invention. System 1200 can be similar or identical to system 100 of FIG. 1 and can include a primary device 102 and supporting device 104 as described above. In this example, the user interface of supporting device 104 includes user-operable mode selection elements 1202, 1204. Selection elements 1202, 1204 can be, e.g., touchable areas of a touchscreen interface. Selection element 1202 is currently active, as indicated by the underline (other indicia can be substituted), meaning that system 1200 is currently in tutorial mode. Thus, for example, the user can interact with primary device 102 and view related explanatory information via supporting device 104. This tutorial mode operation can be similar or identical to operations described above, including any or all of processes 900, 1000, and 1100.

Selection elements 1202, 1204 can be included in each information presentation in tutorial mode. At any time during tutorial-mode operation, the user can select control 1204 to switch to textbook mode. In textbook mode, the user can interact directly with supporting device 104. For example, supporting device 104 can present various interactive informational screens, and the user can perform touch gestures on particular areas of the information screens to interact with the information. Any type of information can be presented in textbook mode. For example, if primary device 102 is part of a family of related devices that have different options or features, the textbook mode can be used to present detailed information about the different options and features. Other information can include information about accessory devices that can be used with primary device 102 but are not incorporated into tutorial system 1200 (e.g., watchbands, headsets, cases, speakers, monitors, etc.).

As another example, in some embodiments, primary device 102 may have certain functionalities that are not enabled within tutorial system 1200 (e.g., making phone calls), and information about these functionalities can be available in textbook mode. For instance, if a user in tutorial mode tries to invoke a telephone functionality of primary device 102 when that functionality is disabled in tutorial system 1200, the explanatory information at supporting device 104 can invite the user to switch to textbook mode to learn more about the telephone functionality.

Information presented in textbook mode can be presented in any format supported by supporting device 104. Examples include text, animations, videos, audio, and any combination thereof. The information can be arranged in a browsable format. For instance, the user can be prompted (or guided by the arrangement of information on the screen) to touch different areas of the screen to access different information presentations.

While tutorial system 1200 is in textbook mode, primary device 102 can remain in the state it was in at the time textbook mode was entered, or it can reset to its initial state; examples are described below. In some embodiments, when tutorial system 1200 is in textbook mode, supporting device 104 can send event messages to primary device 102, and primary device 102 can update its display based on the event messages. For instance, if the user navigates within textbook mode to view information about watch faces, primary device 102 can present an animated slide show of different watch faces.

The user can exit textbook mode at any time, e.g., by touching selection element 1202 to return system 1200 to tutorial mode. In some embodiments, whenever system 1200 is in textbook mode, any user interaction with primary device 102 can result in system 1200 returning to tutorial mode.

Figure 13:
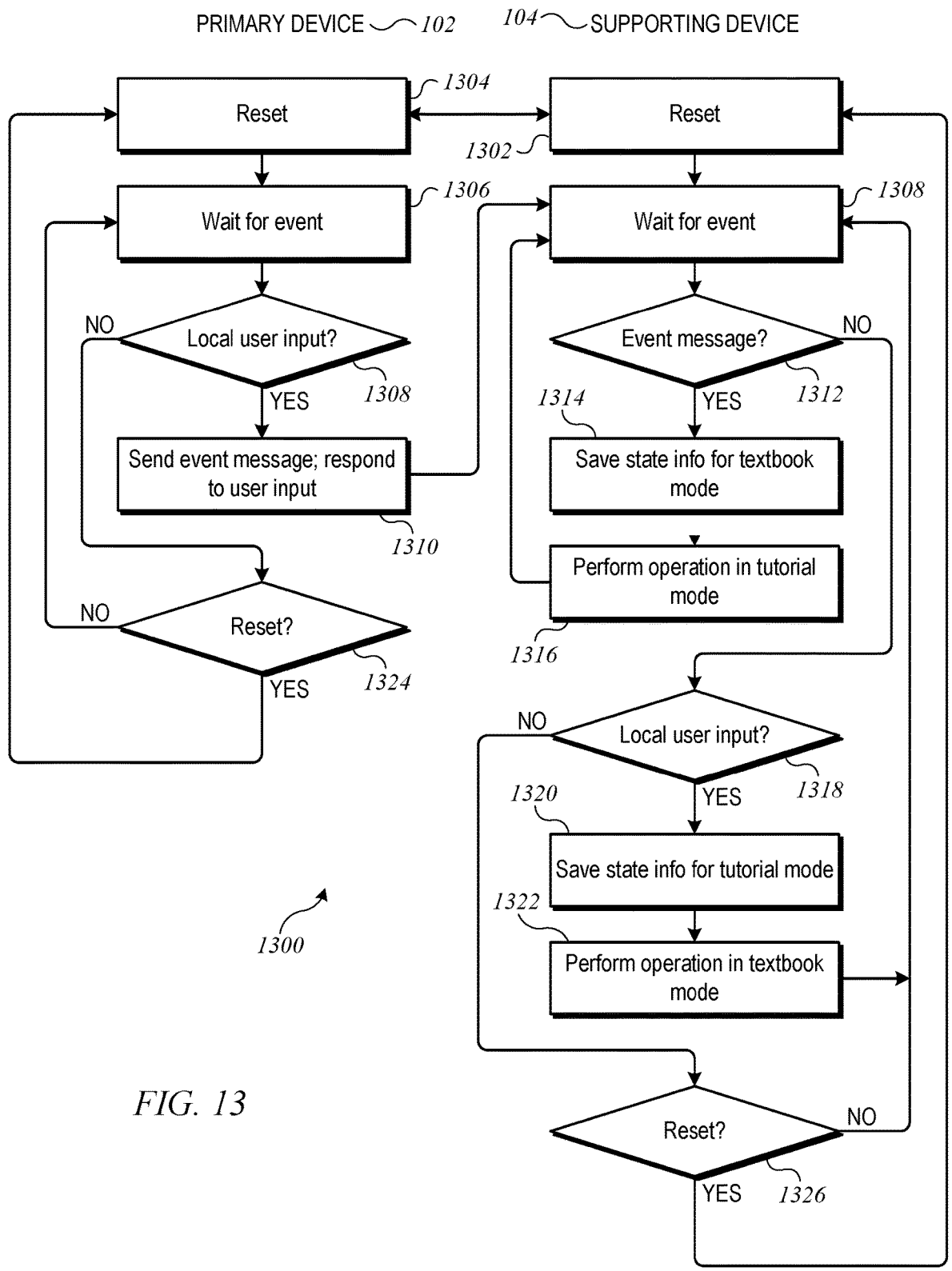
FIG. 13 is a flow diagram of a process for operating a tutorial system according to an embodiment of the present invention.

FIG. 13 is a flow diagram of a process 1300 for operating a tutorial system (e.g., tutorial system 1200) according to an embodiment of the present invention. Portions of process 1300 can be performed by a primary device (e.g., primary device 102), and other portions of process 1300 can be performed by a supporting device (e.g., supporting device 104).

At blocks 1302 and 1304, primary device 102 and supporting device 104 can perform a reset operation, e.g., as described above with reference to FIG. 11. The reset operation can end with primary device 102 and supporting device 104 each in an initialized state. For example, as noted above, supporting device 104 can initialize its local user interface to present an introductory message. In this case, the introductory message can include, e.g., an invitation prompting the user to interact with either primary device 102 (entering tutorial mode) or supporting device 104 (entering textbook mode). As noted above, the initialized state for primary device 102 can be similar or identical to an "idle" mode that primary device 102 would normally (i.e., during non-tutorial operation) enter after connecting to a paired companion device and can include presenting selected information (or no information) to the user. At blocks 1306, 1308, primary device 102 and supporting device 104 can wait for an event. For primary device 102, the event can include any of: a local user input at the user interface of primary device 102; or a reset event (e.g., timeout as described above). For supporting device 104, the event can include any of: an event message from primary device 102 (reporting a local user input at the user interface of primary device 102); a local user input at the user interface of supporting device 104; or a reset event (e.g., timeout as described above). Primary device 102 and supporting device 104 can respond accordingly to the particular event.

For example, the event can be a local user input received at primary device 102. At block 1310, primary device 102 can determine that a local user input has been received. At block 1312, primary device 102 can send an event message to secondary device 104 and respond to the user input. These operations can be similar or identical to user input processing operations described above with reference to FIG. 9.

In the case of a local user input at primary device 102, supporting device 104 can receive an event message at block 1310. At block 1312, supporting device 104 can save state information for the textbook mode (if the last event occurred in textbook mode), and at block 1314, supporting device 104 can perform an operation in tutorial mode. The operation can be similar or identical to event-processing operations described above with reference to FIG. 9. Saving the state information for the textbook mode can allow the user to easily return to previously presented textbook information (e.g., by selecting "textbook" selection control 1204 from the tutorial-mode screen shown in FIG. 12).

As a second example, at block 1308, the event can be a local user input at supporting device 104. In this case, supporting device 104 can detect the user input at block 1316. At block 1318, supporting device 104 can save state information for the tutorial mode (if the last event occurred in tutorial mode), and at block 1320, supporting device 104 can perform an operation in textbook mode. The operation in textbook mode can include selecting information to present based on the received input as well as state information that can include previous inputs received or information presented in the textbook mode; a detailed description of selecting and presenting information is omitted; such operations can be similar to existing interactive-presentation operations. Saving the state information for the tutorial mode can allow the user to easily return to a tutorial in progress (e.g., by interacting with primary device 102). While supporting device 104 is operating in textbook mode, primary device 102 can continue to wait for an event. In some embodiments, supporting device 104 can send event messages to primary device 102 in response to local user input detected at block 1316; where this occurs, primary device 102 can provide information related to user inputs received at supporting device 104 during textbook mode operation.

As a third example, at blocks 1306 and 1308, the event can be a reset event. Similarly to embodiments described above, a reset event can occur, e.g., if the user does not interact with either device for a timeout period, if the connection between primary device 102 and supporting device 104 is lost, or if an express reset instruction is received at either device. Primary device 102 can detect a reset event at block 1322 and reset at block 1302; supporting device 104 can detect a reset event at block 1324 and reset at block 1304. In some embodiments, if either primary device 102 or supporting device 104 detects a reset event, it can communicate the event to the other device so that both devices can reset concurrently.

Primary device 102 can be but need not be aware of the existence of textbook mode or whether supporting device 104 has entered textbook mode. For example, in the embodiment shown in FIG. 13, supporting device 104 does not notify primary device 102 in response to detecting a local user input at block 1316. Thus, when supporting device 104 enters textbook mode, primary device 102 can just continue to present the same information. In some embodiments, primary device 102 can implement its normal (non-tutorial) behavior, e.g., invoking a screensaver mode if no user input is received for some time period. The screensaver mode can include, e.g., returning the display to a default image (e.g., a watch face, home screen, or animated slide show of various screens) and/or turning off the display (or just a display backlight if one is present). Thus, if desired, primary device 102 can use the same operating system and application software as in its normal (non-tutorial) configuration; a special tutorial app is not required, provided that the normal software generates event messages that can be received and interpreted by supporting device 104. In some embodiments, the software can be modified to generate event messages in circumstances where normal (non-tutorial) operation would not result in generating an event message but otherwise unmodified.

In some embodiments, supporting device 104 can be configured to send event messages to or otherwise notify primary device 102 regarding local user interactions with supporting device 104 that may occur. These event messages can be similar to the messages sent by primary device 102 during tutorial mode; for instance, an event message can indicate a specific user action, a specific information type to be presented, an app to be launched or brought to foreground (e.g., so that the foreground app can drive the display of primary device 102), etc. Thus, in some embodiments, textbook mode can include a "role reversal" relative to tutorial mode. In other words, if, in tutorial mode, the user interacts with primary device 102 while supporting device 104 provides explanatory information, then in textbook mode, the user can interact with supporting device 104 while primary device 102 can provide supplemental information (e.g., screen images) relevant to the information presentation at supporting device 104. For instance, if the user is reading about a calendar app, primary device 102 can present a calendar screen. Operation of primary device 102 to provide event-relevant displays in textbook mode can be implemented, e.g., by providing suitable textbook-mode software to interpret and respond to event messages from supporting device 104. In some embodiments, the software can receive an event message and map the event message to a corresponding local user input event, then proceed as if the corresponding local user input had been received. For instance, if the user operates supporting device 104 to present information about the calendar app, the textbook-mode software on supporting device 104 can map this to a user input (or sequence of user inputs) usable to launch the calendar app and can send notifications to operating system or application processes that this user input was received.

In this manner the user can interact with primary device 102 and/or supporting device 104, switching back and forth as desired. The devices can respond to the user action. The user can switch from tutorial mode to textbook mode (or vice versa) at any time, simply by interacting with the other device. Accordingly, the user can dynamically control the sequence and pace of the presentation of information by the tutorial system.

In process 1300, a reset event detected at either device can trigger a reset of both devices. Resetting can include clearing any state information that has been saved for tutorial and/or textbook mode. In some embodiments, it may be desirable to allow separate resetting of the tutorial and textbook modes. For instance, if the user interacts with system 1200 in tutorial mode, then switches to textbook mode and remains in textbook mode for a sufficiently long time (e.g., 2 minutes, 5 minutes, 10 minutes, or other time period as desired), it may be assumed that the user would prefer not to resume the previous tutorial session, in which case it may be desirable to reset the tutorial mode without also resetting the textbook mode. Conversely, if the user interacts with system 1200 in textbook mode, then switches to tutorial mode and remains in tutorial mode for a sufficiently long time (e.g., 2 minutes, 5 minutes, 10 minutes, or other time period as desired), it may be assumed that the user would prefer not to resume the previous textbook session, in which case it may be desirable to reset the textbook mode without also resetting the tutorial mode.

Figure 14:
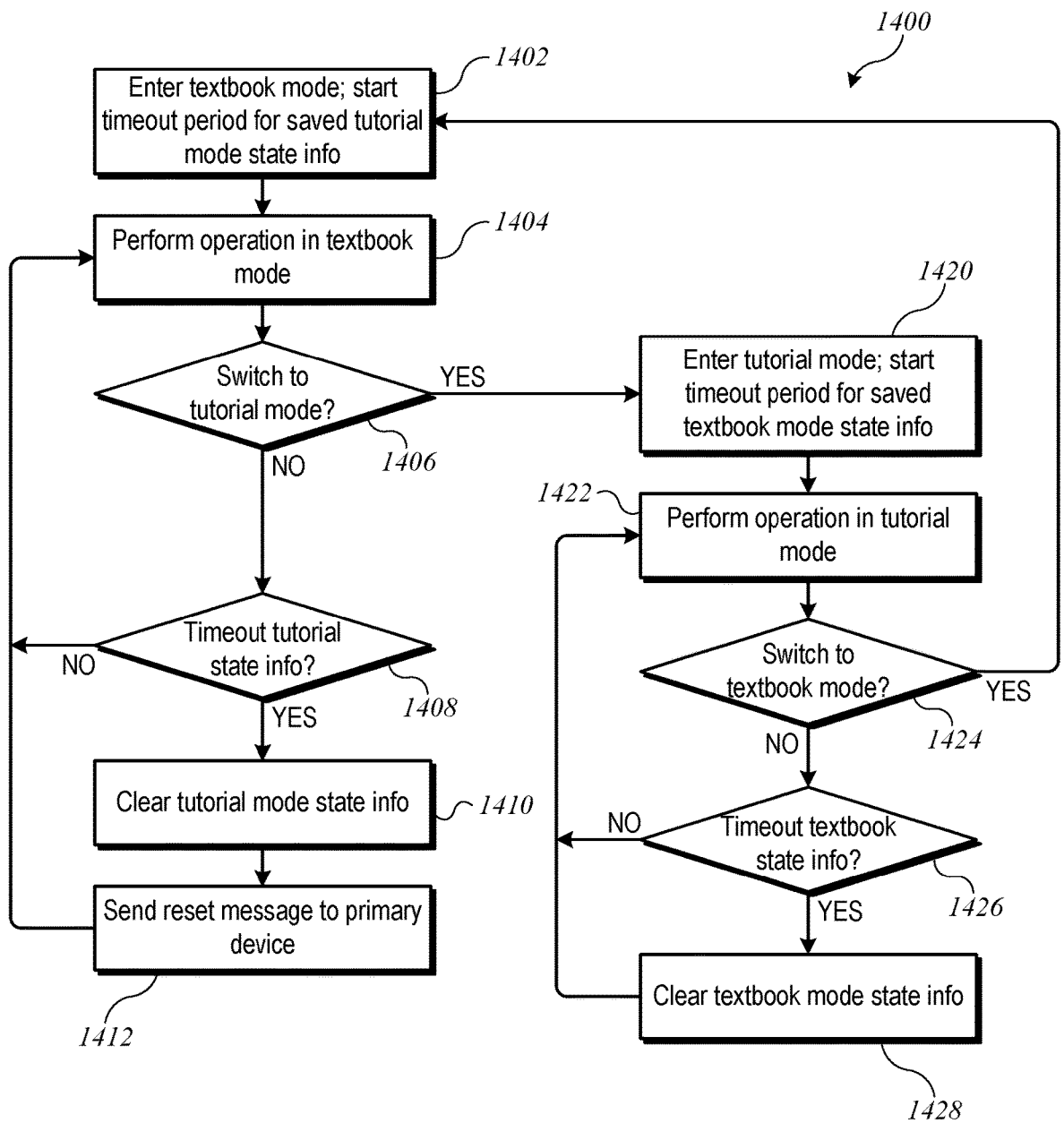
FIG. 14 is a flow diagram of a process for managing state information according to an embodiment of the present invention.

Accordingly, certain embodiments of the present invention provide separate resetting of the state information for textbook and tutorial modes. FIG. 14 is a flow diagram of a process 1400 for managing state information according to an embodiment of the present invention. Process 1400 can be implemented in a supporting device (e.g., supporting device 104) and can be used in combination with process 1300 described above.

Process 1400 can begin, e.g., when supporting device 104 enters textbook mode. As described above, entering textbook mode can occur when supporting device 104 detects a user input at its local user interface (e.g., as described with reference to block 1316 of process 1300). At block 1402, upon entering textbook mode, supporting device 104 can save the state information for the tutorial mode (e.g., as described with reference to block 1318 of process 1300) and can start a timeout period for the saved tutorial-mode state information. At block 1404, supporting device 104 can perform one or more operations in textbook mode (e.g., as described with reference to block 1320 of process 1300).

At block 1406, supporting device 104 can determine whether to switch to tutorial mode. For example, as described above, supporting device 104 can switch to tutorial mode in response to an event message indicating a user input received at primary device 102. If supporting device 104 does not switch to tutorial mode, then at block 1408, supporting device 104 can determine whether the timeout period for the saved tutorial state information has expired. The timeout period can have a prescribed duration, e.g., 2 minutes, 5 minutes, 10 minutes, or other duration as desired. If the timeout period has expired, then at block 1410, supporting device 104 can clear the tutorial-mode state information that was saved upon entering textbook mode (at block 1402). At block 1412, supporting device 104 can send a reset message to primary device 102; this can be, e.g., a message instructing primary device 102 to perform reset operations as described above with reference to FIG. 11. In this instance, however, supporting device 104 does not reset; except for clearing the tutorial-mode state information, it continues to operate from its current state.

At block 1420, supporting device 104 can enter tutorial mode. As described above, entering tutorial mode can occur when supporting device 104 detects an event message from primary device 102 (e.g., as described with reference to block 1310 of process 1300). Upon entering tutorial mode, supporting device 104 can save the state information for the textbook mode (e.g., as described with reference to block 1312 of process 1300) and can start a timeout period for the saved textbook-mode state information. At block 1422, supporting device 104 can perform one or more operations in tutorial mode (e.g., as described with reference to block 1314 of process 1300).

At block 1424, supporting device 104 can determine whether to switch to textbook mode. For example, as described above, supporting device 104 can switch to textbook mode in response to a local user input received at the local user interface of supporting device 104. If supporting device 104 does not switch to textbook mode, then at block 1426, supporting device 104 can determine whether the timeout period for the saved textbook state information has expired. The timeout period can have a prescribed duration, e.g., 2 minutes, 5 minutes, 10 minutes, or other duration as desired, which can be the same as or different from the timeout period for saved tutorial-mode state information at block 1408. If the timeout period has expired, then at block 1428, supporting device 104 can clear the textbook-mode state information that was saved upon entering tutorial mode (at block 1402). In the embodiment shown, primary device 102 can be unaware of textbook mode and a notification of clearing the textbook-mode state information is not sent. In other embodiments, supporting device 104 can notify primary device 102 when textbook-mode state information is being cleared.

As shown, supporting device 104 can continue to operate in the textbook mode at block 1404 during and after the timeout period for the tutorial-mode state information, until such time as block 1406 results in switching to tutorial mode. Similarly, supporting device 104 can continue to operate in the tutorial mode at block 1422 during and after the timeout period for the tutorial-mode state information, until such time as block 1424 results in switching to tutorial mode. In some embodiments, a system reset (not expressly shown in FIG. 14) can occur if no user input is received at either device within a "system" timeout period. The system reset can occur as described above with reference to FIG. 13. The system timeout period can be the same as or different from either of the mode-specific timeout periods at blocks 1408 and 1426, and the mode-specific timeout periods can be the same as or different from each other as desired.

Figure 15:
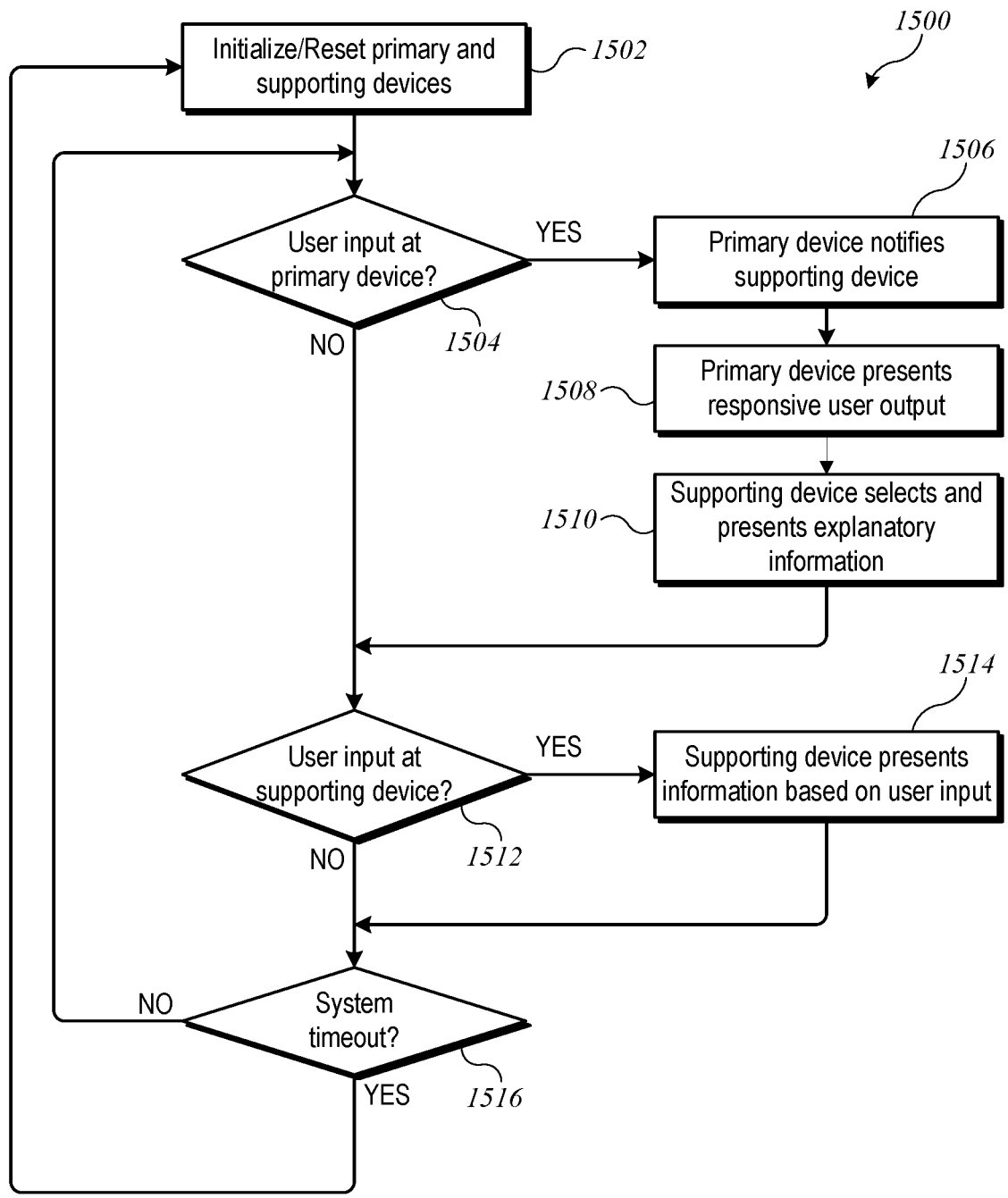
FIG. 15 is a flow diagram of a process for a tutorial system according to an embodiment of the present invention.

Further illustrating the interoperation of devices in a tutorial system, FIG. 15 is a flow diagram of a process 1500 for a tutorial system such as tutorial system 1200 of FIG. 12 according to an embodiment of the present invention.

Process 1500 can begin at block 1502, when a primary device (e.g., primary device 102) and supporting device (e.g., supporting device 104) of a tutorial system (e.g., tutorial system 1200) are initialized (or reset). This can be similar to initialization or resetting actions described above, e.g., with reference to FIG. 11. In some embodiments, initialization can also include establishing a connection between primary device 102 and supporting device 104, e.g., as described above with reference to FIG. 7.

At block 1504, if user input is received at primary device 102, then at block 1506, primary device 102 can notify supporting device 104, e.g., by sending an event message as described above. At block 1508, primary device 102 can present user output responsive to the received user input, and at block 1510, supporting device 104 can select and present explanatory information based on the received event message. In some embodiments, operations described above with reference to FIG. 9 (e.g., blocks 910-926 of process 900) can be performed, including fetching of requested data by supporting device 104 and delivery of fetched data to primary device 102 (e.g., as described with reference to FIG. 10). This can correspond to operation in tutorial mode as described above, and operation in tutorial mode can continue until such time as the user stops interacting with primary device 102. In some embodiments, operating in tutorial mode can include using a mode-specific timeout period to determine whether to clear any textbook-mode state information that may have been stored (e.g., as described above with reference to FIG. 14).

At block 1512, if user input is received at supporting device 104, then at block 1514, supporting device 104 can present information based on the received user input. This can correspond to operation in textbook mode as described above, and operation in textbook mode can continue until such time as the user stops interacting with supporting device 104. In some embodiments, operating in textbook mode can include using a mode-specific timeout period to determine whether to clear any tutorial-mode state information that may have been stored (e.g., as described above with reference to FIG. 14). Further, in some embodiments, operation in textbook mode can include sending event messages to primary device 102; primary device 102 can present information based on received event messages, e.g., as described above.

At block 1516, a system timeout event can be detected. For instance, as described above, a system timeout can occur if the user does not provide input to either primary device 102 or supporting device 104 within a prescribed timeout period. In the event of a system timeout, primary device 102 and supporting device 104 can reset at block 1502, and process 1500 can continue indefinitely.

Figure 16:
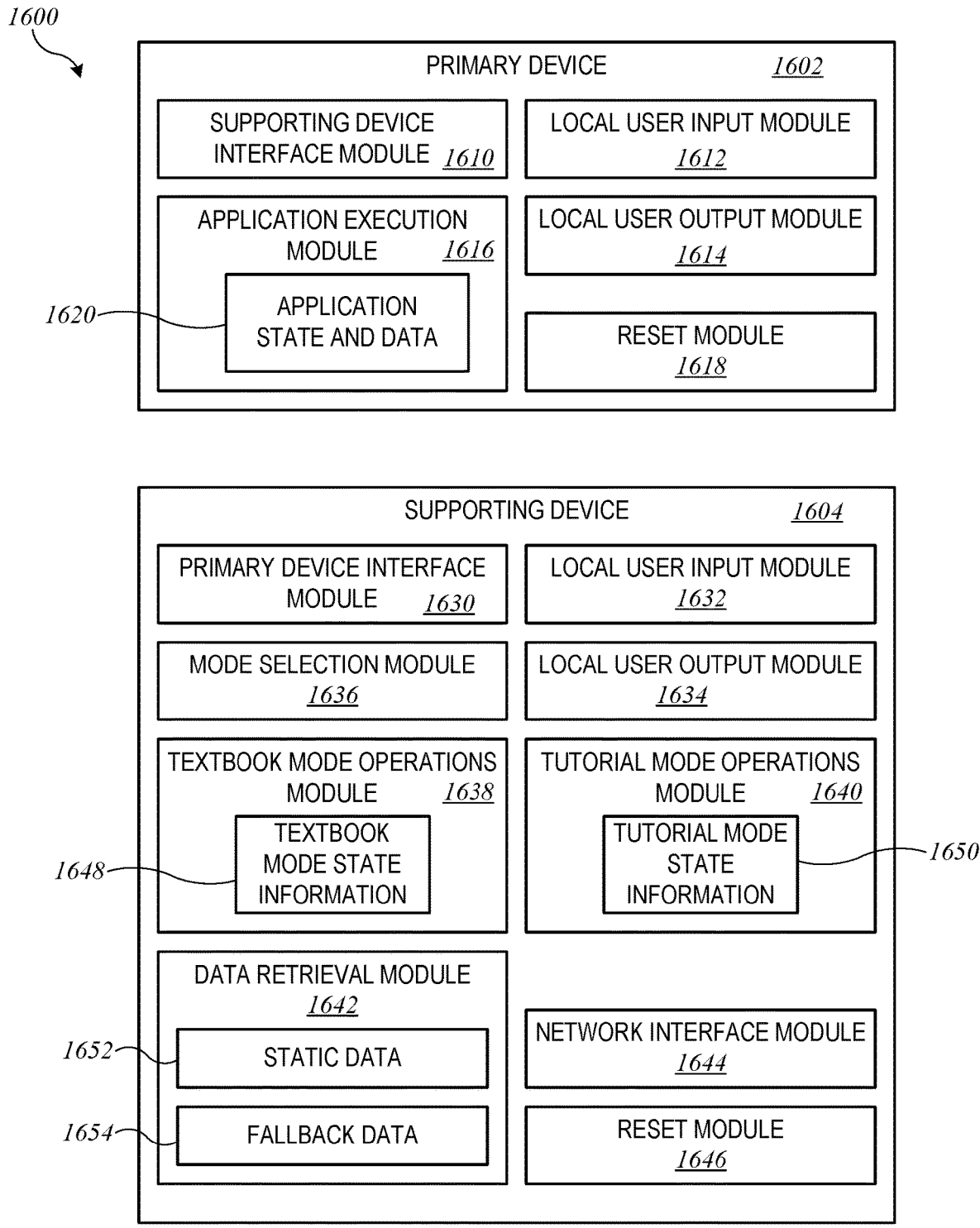
FIG. 16 is a block diagram of a tutorial system according to an embodiment of the present invention.

FIG. 16 is a block diagram of a tutorial system 1600 (e.g., implementing tutorial system 100 or tutorial system 1200 described above) according to an embodiment of the present invention. Tutorial system 1600 can include a primary device 1602 (e.g., implementing primary device 102) and a supporting device 1604 (e.g., implementing supporting device 104).

Primary device 1602 can include a supporting device interface module 1610, a local user input module 1612, a local user output module 1614, an application execution module 1616, and a reset module 1618.

Supporting device interface module 1610 can be configured to communicate with one or more other devices, e.g., including supporting device 1604. For example, supporting device interface module 1610 can be configured to generate and send event messages and/or data requests to supporting device 1604 (e.g., as described with reference to blocks 906, 908 of process 900, block 1310 of process 1300, and/or block 1506 of process 1500) and to receive responses to data requests from supporting device 1604 (e.g., as described with reference to blocks 910 and 912 of process 900). Supporting device interface module 1610 can also be configured to receive reset messages and/or other event messages from supporting device 1604 (e.g., as described with reference to block 928 of process 900 and/or block 1324 of process 1300). In some embodiments, supporting device interface module 1610 can also perform connection operations to connect to a supporting device (e.g., as described with reference to primary-device operations of process 700). In some embodiments, supporting device interface module 1610 can be implemented similarly to data communication interface 316 described above.

Local user input module 1612 can be configured to receive input from a user (e.g., as described with reference to block 904 of process 900 and/or block 1504 of process 1500). For example, local user input module 1612 can include a touch-sensitive input element of touchscreen 326 and/or control button/dial 328 described above. Local user output module 1614 can be configured to present information to a user (e.g. as described with reference to block 926 of process 900, block 1310 of process 1300, and/or block 1508 of process 1500). Information can be presented in any user-perceptible form, including visual presentation, audio presentation, haptic presentation (a movement of the device or a portion thereof that the user can feel), and any other user-perceptible output. (As used herein, "presenting" information or output to a user does not require that any user actually perceives the information.) For example, local user output module 1614 can include a display element of touchscreen 326. Local user input module 1612 and local user output module 1614 can be "local" to primary device 1602, meaning that the physical elements with which the user interacts are physically located on or under a surface of primary device 1602 itself, as distinct from any "remote" input that primary device 1602 might receive via supporting device interface module 1610 or other data communication interfaces.

Application execution module 1616 can be configured to execute application and operating system programs (e.g., operating system 320 and any or all of apps 321-324 and/or other apps). In some instances, execution of application and operating system programs by application execution module 1616 can include processing user input received by local user input module 1612 and determining information to be presented by local user output module 1614 (e.g., as described with reference to blocks 904 and 926 of process 900, block 1310 of process 1300, and/or blocks 1504 and 1508 of process 1500). In some instances, execution of application and operating system programs by application execution module 1616 can include interacting with supporting device interface module 1610, e.g., to send event messages, to request data to be used by an application or operating system program, and/or to receive requested data as described above. Application execution module 1616 can include an application state and data store 1620. In some embodiments, application execution module 1616 can be implemented similarly to processing subsystem 310 described above.

Reset module 1618 can be configured to perform reset processing operations (e.g., as described with reference to blocks 1104, 1106, 1108 of process 1100, block 1304 of process 1300, and/or block 1502 of process 1500). For example, reset module 1618 can store a "master" data set for applications installed on primary device 1602 and can overwrite application state and data store 1620 with the master data set during a reset. In some embodiments, reset module 1618 can also be configured to determine when to perform a reset operation for primary device 102, e.g., based on a timeout and/or on messages received from supporting device 1604 (e.g., as described above with reference to block 928 of process 900, block 1324 of process 1300, and/or block 1516 of process 1500).

Supporting device 1604 can include primary device interface module 1630, local user input module 1632, local user output module 1634, mode selection module 1636, textbook mode operations module 1638, tutorial mode operations module 1640, data retrieval module 1642, network interface module 1644, and reset module 1646.

Primary device interface module 1630 can be configured to communicate with one or more other devices, e.g., including primary device 1602. For example, primary device interface module 1630 can be configured to communicate with supporting device interface module 1610 of primary device 1602. In some embodiments, primary device interface module 1630 can be configured to receive event messages and/or data requests from primary device 1602 (e.g., as described with reference to blocks 914, 916, 920 of process 900, blocks 1308 and 1312 of process 1300, and/or block 1506) and to send responses to data requests to primary device 1602, as described with reference to block 920 of process 900). Primary device interface module 1630 can also be configured to send reset messages and/or other event messages to primary device 1602 (e.g., as described with reference to block 930 of process 900, block 1326 of process 1300, and/or block 1412 of process 1400). In some embodiments, primary device interface module 1630 can also perform connection operations to connect to a primary device (e.g., as described with reference to supporting-device operations of process 700). In some embodiments, primary device interface module 1630 can be implemented similarly to data communication interface 356 described above.

Local user input module 1632 can be configured to receive input from a user (e.g., as described with reference to block 1318 of process 1300 and/or block 1512 of process 1500). For example, local user input module 1632 can include a touch-sensitive input element of touchscreen 366 described above. Local user output module 1634 can be configured to present information to a user (e.g., as described with reference to block 924 of process 900, blocks 1316 and 1322 of process 1300, blocks 1404 and 1422 of process 1400, and/or blocks 1510 and 1514 of process 1500). Information can be presented in any user-perceptible form, including any of the forms described above with reference to local user output module 1634. For example, local user output module 1634 can include a display element of touchscreen 366. Local user input module 1632 and local user output module 1634 can be "local" to supporting device 1604, meaning that the physical elements with which the user interacts are physically located on or under a surface of supporting device 1604 itself, as distinct from any "remote" input that supporting device 1604 might receive via primary device interface module 1630 or other data communication interfaces.

Mode selection module 1636 can be configured to determine whether textbook mode operations module 1638 or tutorial mode operations module 1640 is active, e.g., based on user input received by local user input module 1632 and/or event messages received by primary device interface module 1630. For example, mode selection module 1636 can be configured to make a mode determination based at least in part on whether a most recent event message was received before or after a most recent local user input; tutorial mode can be selected if the event message is more recent, and textbook mode if the user input is more recent. In some embodiments, mode selection module 1636 can implement mode switching operations as described above (e.g., with reference to blocks 1314, 1320 of process 1300 and/or blocks 1402, 1406, 1420, 1424 of process 1400). In some embodiments, mode selection module 1636 can be implemented using processing subsystem 350 described above executing suitable program code (e.g., portions of support app 361).

Textbook mode operations module 1638 can be configured to select information to be presented by local user output module 1634 based on user input received by local user input module 1632, e.g., as described with reference to block 1322 of process 1300, block 1404 of process 1400, and/or block 1514 of process 1500. For example, as described above, textbook mode operations can be based on a browsable collection of content items, and after presenting a first content item, selection of each subsequent content item to be presented can be responsive to specific user input received by local user input module 1632. In some embodiments, textbook mode operations module 1638 can maintain textbook-mode state information 1648, which can include, e.g., a representation of a sequence of received user inputs and/or presented content items. As described above, textbook-mode state information 1648 can be used in selecting content items, e.g., providing a history-dependent presentation. In some embodiments, textbook mode operations module 1638 can be implemented using processing subsystem 350 described above executing suitable program code (e.g., portions of support app 361).

Tutorial mode operations module 1640 can be configured to select information to be presented by local user output module 1634 based on event messages received by primary device interface module 1630, e.g., as described with reference to block 924 of process 900, block 1316 of process 1300, block 1422 of process 1400, and/or block 1510 of process 1500. For example, as described above, tutorial mode operations can include selecting explanatory information (e.g., particular content items or presentations) based on an event type identified in the event message. In some embodiments, tutorial mode operations module 1640 can maintain tutorial-mode state information 1650, which can include, e.g., a representation of a sequence of received event messages and/or event types. As described above, tutorial-mode state information 1650 can be used in selecting information to present, e.g., providing a history-dependent presentation as described with reference to block 924 of process 900, block 1316 of process 1300, block 1422 of process 1400, and/or block 1510 of process 1500. In some embodiments, tutorial mode operations module 1640 can be implemented using processing subsystem 350 described above executing suitable program code (e.g., portions of support app 361).

Data retrieval module 1642 can be configured to retrieve data in response to an event message (including a data request) received by primary device interface module 1630 and to provide the data to primary device 1602 via primary device interface module 1630. For example, data retrieval module 1642 can implement block 918 of process 900 as described above with reference to FIG. 10. In some embodiments, data retrieval module 1642 can include static data store 1652 to provide static data as described above and/or fallback data store 1654 to provide fallback data in the event that an attempt to retrieve data via a network is unsuccessful. In some embodiments, data retrieval module 1642 can be implemented using processing subsystem 350 described above executing suitable program code (e.g., portions of support app 361 or other applications or operating system programs).

Network interface module 1644 can be configured to communicate with a wide area network such as the Internet and can be used, e.g., to retrieve data when requested by data retrieval module 1642. Examples of data request and retrieval are described above with reference to blocks 1008-1012 of the data fetch process of FIG. 10. In some embodiments, network interface module 1644 can be implemented similarly to data communication interface 356 described above.

Reset module 1646 can be configured to perform reset processing operations, e.g., as described above with reference to blocks 1102, 1110, 1112, and 1114 of process 1100, block 1302 of process 1300, and/or block 1502 of process 1500. In some embodiments, reset module 1646 can also be configured to determine when to perform a reset operation, e.g., based on a timeout and/or on messages received from primary device 1602; examples are described above with reference to block 930 of process 900, block 1326 of process 1300, and/or block 1516 of process 1500. In some embodiments, reset module 1646 can include timeout logic as described above. Depending on implementation, reset module 1646 can perform a mode-specific reset (e.g., clearing the state information for either tutorial or textbook mode without affecting the other mode as described above with reference to blocks 1410 and 1428 of process 1400) and/or a system reset (e.g., clearing both modes and initiating a reset of both devices as described above with reference to block 1326 of process 1300 and/or block 1516 of process 1500). Reset module 1646 can include timers and/or timer logic to implement the timeout operations as described above. In some embodiments, reset module 1646 can be implemented using processing subsystem 350 described above executing suitable program code (e.g., portions of support app 361).

It will be appreciated that the tutorial system and processes described herein are illustrative and that variations and modifications are possible. Process operations described as sequential may be executed in parallel, order of operations may be varied, and operations may be modified, combined, added or omitted. A tutorial system can support just a tutorial mode or both tutorial and textbook modes as desired. In the tutorial mode, the user can interact with the primary device (i.e., the device whose operation the user is learning or exploring) while the supporting device presents explanatory, or supplemental, information that can aid the user in understanding responses and/or input options of the primary device. This explanatory, or supplemental, information can be presented in any format desired, including text, audio, videos, images, animations, or any combination of formats. In the textbook mode, the user can interact directly with the supporting device to explore additional information, including in particular information about the primary device. Such additional information can include text, audio, videos, images, animations, interactive animations (e.g., where the user can control the animation via inputs at the supporting device), and so on. For example, the additional information might include a video demonstration or other description of a particular functionality, interaction, or sequence of interactions with the primary device. The user can study the demonstration or other description, then execute the interaction on the primary device component of the system (returning to tutorial mode) while the supporting device provides guidance based on what the user actually does. As another example, the additional information might include a description of features and options of the primary device that are not readily apparent from the tutorial system (e.g., available accessories for the primary device; available options for the primary device itself such as different sizes, memory capacities, colors and materials, etc.; pricing information; and the like). In some embodiments, other modes can also be supported in addition to or instead of the textbook mode.

While the invention has been described with respect to specific embodiments, one skilled in the art will recognize that numerous modifications are possible. The primary and supporting devices can be modified as desired and are not limited to any particular device type, form factor, size, user interface components, operational capabilities, communication channels, etc. Although a number of different features, components, and operations may be described in connection with various embodiments, it is to be understood that other embodiments can include other combinations or subcombinations of features, components, and operations described herein, as well as features, components, and operations not expressly described.

In some embodiments, a tutorial system can be provided as a unit. For instance, a primary device and secondary device can be installed in a shared outer housing such that the user interfaces of both devices are accessible to a user (e.g., through openings in the housing). The housing can enclose other system components, such as elements of a wired connection (e.g., connectors, wires, cables, circuit boards, etc.) and power supply components (e.g., batteries, power converters, etc.) Alternatively, component devices can be supplied separately from each other, and a system provider (or end user) can connect them for operation as a tutorial system.

Tutorial systems can be deployed in a number of different settings. For example, in a training facility or setting, tutorial systems of the kind described herein can be provided to trainees for hands-on training on the use of a primary device. The primary device can be an off-the-shelf device or a custom device (including, e.g., custom-built hardware or customized software for a particular corporate setting or application). In a retail or other marketplace setting, systems of the kind described herein can be provided to allow users to learn about a primary device that they might be considering whether to purchase.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:
1. A method of operating a tutorial system comprising:
   presenting, at a display of a supporting device communicatively coupled with a primary device, an initial information presentation;
   detecting, at the supporting device, a user interaction;

determining, by the supporting device whether the user interaction is an event message from the primary device to the supporting device indicating a user interaction with the primary device for a type of event;

in response to the determination that the user interaction is the event message received from the primary device to the supporting device indicating the user interaction with the primary device:

performing an operation on the supporting device in a tutorial mode, wherein performing the operation in the tutorial mode comprises:

determining, by the supporting device, interactive explanatory information requested to be displayed on the supporting device in the tutorial mode, wherein the interactive explanatory information is based on the type of event identified in the event message received from the primary device;

retrieving, by the supporting device, the interactive explanatory information requested by the primary device based on the type of event identified in the event message;

presenting the interactive explanatory information describing the primary device at the display of the supporting device, the interactive explanatory information based at least in part on the type of event identified in the event message; and saving state information for the tutorial mode such that a subsequent operation in the tutorial mode is based in part on the saved state information for the tutorial mode.

2. The method according to claim 1, further comprising:
determining, by the supporting device whether the user interaction is a user input event at the display of the supporting device, in which a user operates the supporting device to present information regarding the primary device;

in response to a determination that the user interaction is the user input event at the display of the supporting device:

selecting a textbook mode;
activating the textbook mode; and
performing an operation in the textbook mode, wherein the operation in the textbook mode includes presenting general information describing the primary device at the display of the supporting device.

3. The method of claim 2, wherein the operation in the tutorial mode is based in part on the type of event and in part on one or more prior event messages.

4. The method of claim 3 wherein the state information for the tutorial mode includes history information related to the prior event messages.

5. The method of claim 2, wherein the operation in the textbook mode is based in part on a specific user input received at the display and in part on one or more prior user inputs received at the display, the method further comprising:

prior to performing an operation in the tutorial mode, saving the state information for the textbook mode such that the subsequent operation in the textbook mode is based in part on the saved state information for the textbook mode.

6. The method of claim 5 wherein the state information for the textbook mode includes history information related to the prior user inputs.

7. The method of claim 1 wherein user interactions are detected and operations are performed repeatedly and iteratively, the method further comprising:

in response to a determination that a timeout period elapses without receiving the user interaction, returning to the initial information presentation and sending a reset message to the primary device.

8. The method of claim 1, wherein presenting the interactive explanatory information in the tutorial mode includes selecting the interactive explanatory information to be presented based in part on the event message and in part on an event history including one or more previously received event messages.

9. The method of claim 1 wherein the operation in the tutorial mode further includes:

determining, by the supporting device, based on the event message, whether event-related data should be provided to the primary device; and in response to a determination that the event-related data should be provided to the primary device:

determining, by the supporting device, whether the event-related data is static data or dynamic data;

in response to a determination that the event-related data is the static data, retrieving the event-related data from a local storage subsystem of the supporting device;

in response to a determination that the event-related data is the dynamic data, retrieving the event-related data from a remote source via a wide area network connection; and providing the retrieved event-related data to the primary device.

10. An electronic device comprising:
a primary device interface configured to communicate with a primary device;
a display; and
a processor coupled to the primary device interface and the display, the processor being configured to:
present, at the display, an initial information presentation;
detect a user interaction;
determine whether the user interaction is an event message from the primary device to the electronic device indicating a user interaction with the primary device for a type of event;

in response to the determination that the user interaction is the event message received from the primary device to the electronic device indicating the user interaction with the primary device:

perform an operation in a tutorial mode, wherein performing the operation in the tutorial mode comprises:

determine interactive explanatory information requested to be displayed on the electronic device in the tutorial mode, wherein the interactive explanatory information is based on the type of event identified in the event message;

retrieve the interactive explanatory information requested by the primary device based on the type of event identified in the event message;

presenting the interactive explanatory information describing the primary device at the display of the electronic device, the interactive explanatory information based at least in part on the type of event identified in the event message received from the primary device; and saving state information for the tutorial mode such that a subsequent operation in the tutorial mode is based in part on the saved state information for the tutorial mode.

11. The electronic device of claim 10 wherein the primary device interface includes a wired interface.

12. The electronic device of claim 10 further comprising:
a network communication interface configured to connect to a wide area network.

13. The electronic device of claim 12 wherein the network communication interface includes a wireless interface.

14. A tutorial system comprising:
a primary device comprising:
  a supporting device interface module configured to communicate with another device;
  a local user input module of the primary device configured to receive input from a user;
  a display of the primary device configured to present information to the user; and
  an application execution module configured to execute an application, wherein executing the application includes processing user input received by the local user input module of the primary device and determining information to be presented by the display of the primary device; and
a supporting device comprising:
  a primary device interface module configured to communicate with the supporting device interface module of the primary device;
  a local user input module of the supporting device configured to receive a user interaction from the user;
  a display of the supporting device configured to present information to the user; and
  a tutorial mode operations module configured to:
    receive an event message for a type of event from the primary device selecting a tutorial mode via the primary device interface module;
    determine interactive explanatory information requested to be displayed on the supporting device in the tutorial mode, wherein the interactive explanatory information is based on the type of event identified in the event message received from the primary device; and
    select the interactive explanatory information to be interactively presented by the display based at least in part on the type of event identified in the event message,
    present the interactive explanatory information describing the primary device at the display of the supporting device; and
    save state information for the tutorial mode such that a subsequent operation in the tutorial mode is based in part on the saved state information for the tutorial mode.

15. The system of claim 14 wherein the supporting device further comprises:
a textbook mode operations module configured to select information to be presented by the display of the supporting device based on user input selecting a textbook mode received at the local user input module of the supporting device; and
a mode selection module configured to determine whether the textbook mode operations module or the tutorial mode operations module is active, the determination based at least in part on whether a most recent event message was received before or after a most recent user input.

16. The system of claim 15 wherein:
the tutorial mode operations module is further configured to maintain tutorial state information based on received event messages and to select the information to be presented based in part on the tutorial state information; and
the textbook mode operations module is further configured to maintain textbook state information based on received event messages and to select the information to be presented based in part on the textbook state information.

17. The system of claim 16 wherein the supporting device further comprises:
a reset module configured to reset the display of the supporting device, the tutorial mode operations module, and the textbook mode operations module to an initial state in response to a determination that no user input or event message is received within a first timeout period.

18. The system of claim 17 wherein resetting the tutorial mode operations module and the textbook mode operations module to the initial state includes clearing the tutorial state information and the textbook state information.

19. The system of claim 17 wherein the reset module is further configured to instruct the primary device interface module to send a reset notification to the primary device in response to a determination that no user input or event message is received within the first timeout period.

20. The system of claim 14 wherein the supporting device further comprises:
a data retrieval module configured to retrieve data in response to the event message received by the primary device interface module and to provide the data to the primary device via the primary device interface module; and
a static data store configured to store static data retrievable by the data retrieval module.

21. The system of claim 20 wherein the supporting device further comprises:
a network interface module configured to communicate with a wide area network,
wherein the data retrieval module determines whether to retrieve data from the static data store or via the network interface module based on the event message.

22. The method according to claim 1, wherein a display size of the supporting device is larger than a display size of the primary device.

* * * * *